(12) United States Patent  
Oikawa et al.

(10) Patent No.: US 8,312,312 B2  
(45) Date of Patent: Nov. 13, 2012

(54) DATA STORAGE SYSTEM USING MULTIPLE COMMUNICATION PROTOCOLS

(75) Inventors: Yoshihiro Oikawa, Kaisei (JP); Ikuya Yagisawa, Machida (JP); Bunitsu Ando, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/020,350

(22) Filed: Feb. 3, 2011

(65) Prior Publication Data

US 2011/0125943 A1 May 26, 2011

Related U.S. Application Data

(63) Continuation of application No. 12/007,641, filed on Jan. 14, 2008, now Pat. No. 7,904,744.

(30) Foreign Application Priority Data

Mar. 28, 2007 (JP) .................................. 2007/83225

(51) Int. Cl.  
G06F 11/00 (2006.01)

(52) U.S. Cl. ........................... 714/4.1; 714/6.1; 709/230

(58) Field of Classification Search .................. 714/4, 6; 710/315; 709/230  
See application file for complete search history.

(56) References Cited

U.S. PATENT DOCUMENTS

| | | | |
|---|---|---|---|
| 2006/0041672 A1 | 2/2006 | Day et al. | |
| 2006/0047908 A1* | 3/2006 | Chikusa et al. | 711/114 |
| 2006/0101171 A1 | 5/2006 | Grieff et al. | |
| 2006/0107098 A1 | 5/2006 | Maki et al. | |
| 2006/0112304 A1* | 5/2006 | Subramanian et al. | 714/6 |
| 2007/0070885 A1 | 3/2007 | Uddenberg et al. | |
| 2008/0010530 A1* | 1/2008 | Davies et al. | 714/31 |
| 2008/0244098 A1 | 10/2008 | Oikawa et al. | |

FOREIGN PATENT DOCUMENTS

JP 2006-127217 10/2004

OTHER PUBLICATIONS

Robert C. Elliott, Information technology—Serial Attached SCSI (SAS); Working Draft American National Standard; Project T10/1562-D, Revision 5, Jul. 9, 2003; pp. i-iv and pp. 1-241; XP-002555905.

* cited by examiner

*Primary Examiner* — Philp Guyton  
(74) *Attorney, Agent, or Firm* — Volpe and Koenig, P.C.

(57) ABSTRACT

A controller transmits a second protocol command to a target from among one or more switch devices. The second protocol command is a command which conforms to a second protocol type in which a connection established for transmitting a command to the target is broken during processing of the command by the target, and is defined as a command corresponding to a first protocol command, which is a command conforming to a first protocol type in which the connection remains established during processing of the command by the target.

12 Claims, 22 Drawing Sheets

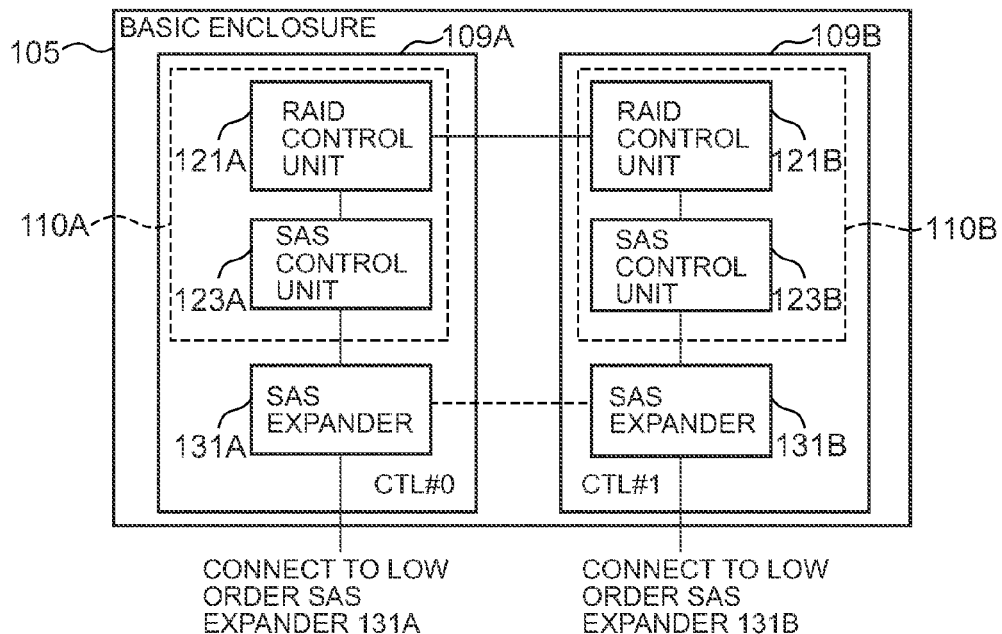
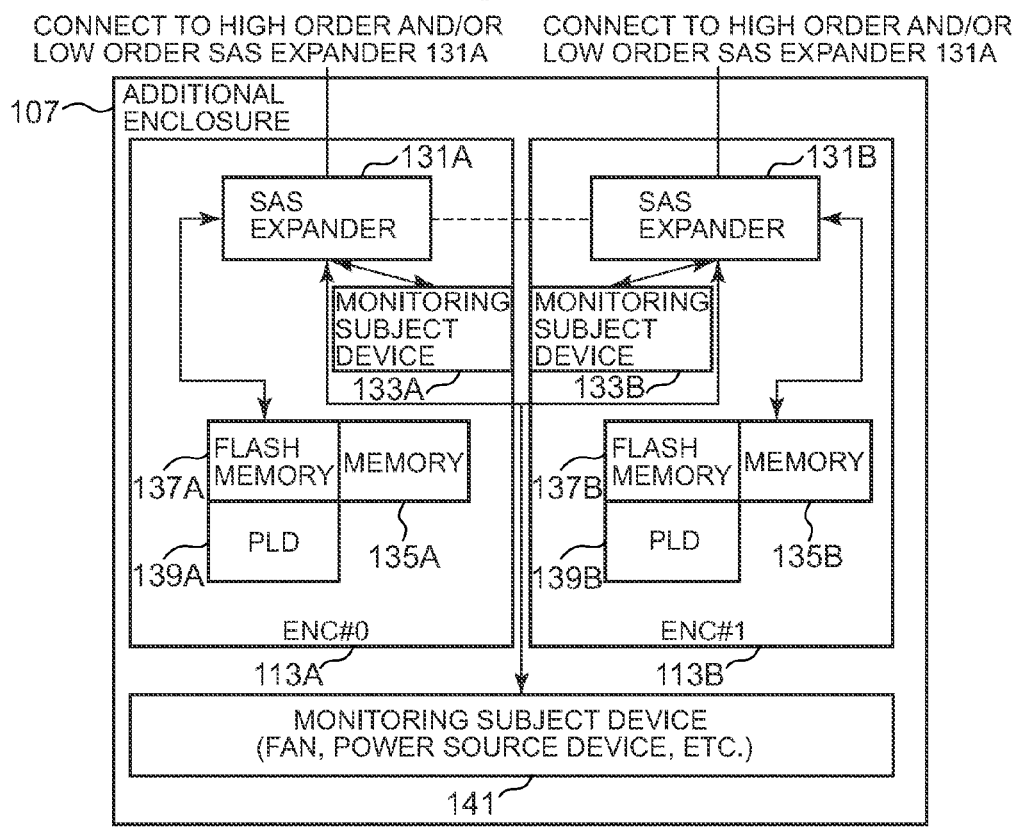

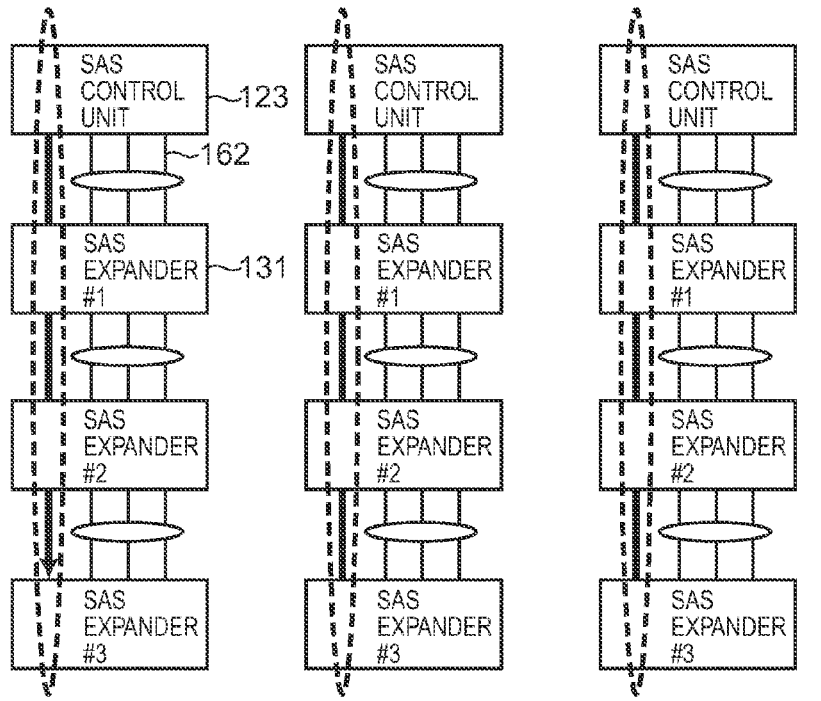
FIG. 5A
CASE OF SMP COMMAND
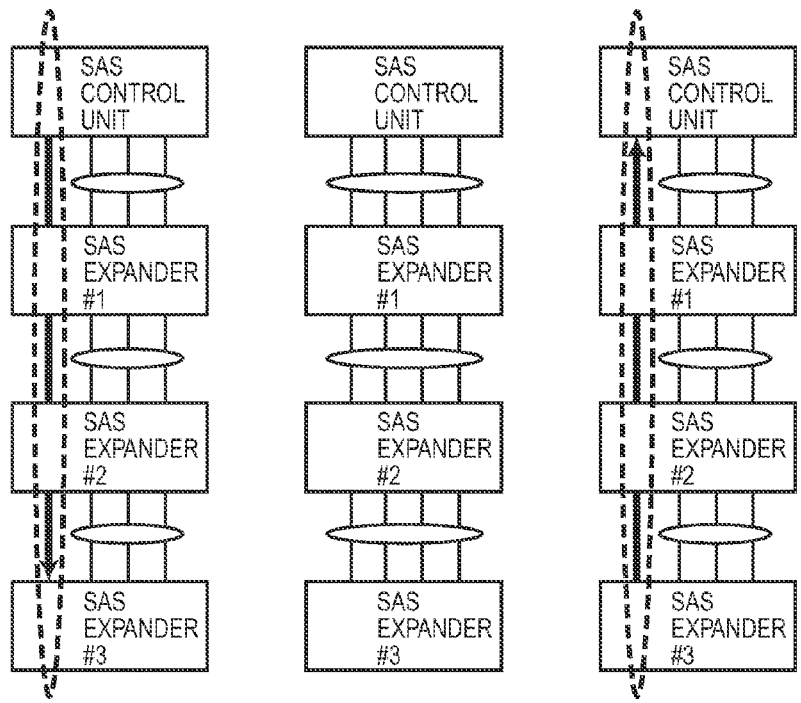
FIG. 5B
CASE OF SSP COMMAND

FIG. 9

| # | SMP COMMAND | | | EXTENDED SSP COMMAND | | | |
|---|---|---|---|---|---|---|---|
| | NAME | FRAME TYPE | FUNCTION | NAME | SEND DIAG | RCV DIAG | |
| | | REQUEST/ RESPONSE | | | REQUEST | RESPONSE | |
| 1 | REPORT GENERAL | 40h/41h | 00h | SSP Report General | - | B0h | |
| 2 | DISCOVER(Request/Response) | 40h/41h | 10h | SSP Discover | B1h | B1h | |
| 3 | | | | SSP Discover Extended | - | B2h | |
| 4 | REPORT PHY ERROR LOG (Request/Response) | 40h/41h | 11h | SSP Report PHY Error Log Extended | - | B3h | |
| 5 | CONFIGURE ROUTE INFORMATION (Request/Response) | 40h/41h | 90h | SSP Configure Route Information | B4h | B4h | |
| 6 | | | | SSP Configure Route Information Extended | B5h | B5h | |
| 7 | PHY CONTROL (Request/Response) | 40h/41h | 91h | SSP PHY Control Extended | B6h | B6h | |
| 8 | REPORT ROUTE INFORMATION (Request/Response) | 40h/41h | 13h | SSP Report Route Information | B7h | B7h | |
| 9 | SMP REPORT PHY SATA (Request/Response) | 40h/41h | 12h | SMP Report Phy SATA Extended | B8h | B8h | |

FIG. 10A

| Bit / Byte | 7 | 6 | 5 | 4 | 3 | 2 | 1 | 0 |
|---|---|---|---|---|---|---|---|---|
| 0 | | | | | | | | |
| 1 | | | | | | | | |
| 2 | PAGE CODE= B2H | | | | | | | |
| 3 | .... | | | | | | | |
| 4 | DATA SIZE OF RESPONSE= ···· | | | | | | | |
| 5 | | | | | | | | |

FIG. 10B

| Bit / Byte | 7 | 6 | 5 | 4 | 3 | 2 | 1 | 0 |
|---|---|---|---|---|---|---|---|---|
| 000H | | | | | | | | |
| | PAGE CODE= B2H | | | | | | | |
| | .... | | | | | | | |
| 008H | | | | | | | | |
| | NUMBER OF PHYS=37 | | | | | | | |
| | .... | | | | | | | |
| | PHY INFORMATION x 37 | | | | | | | |
| | .... | | | | | | | |

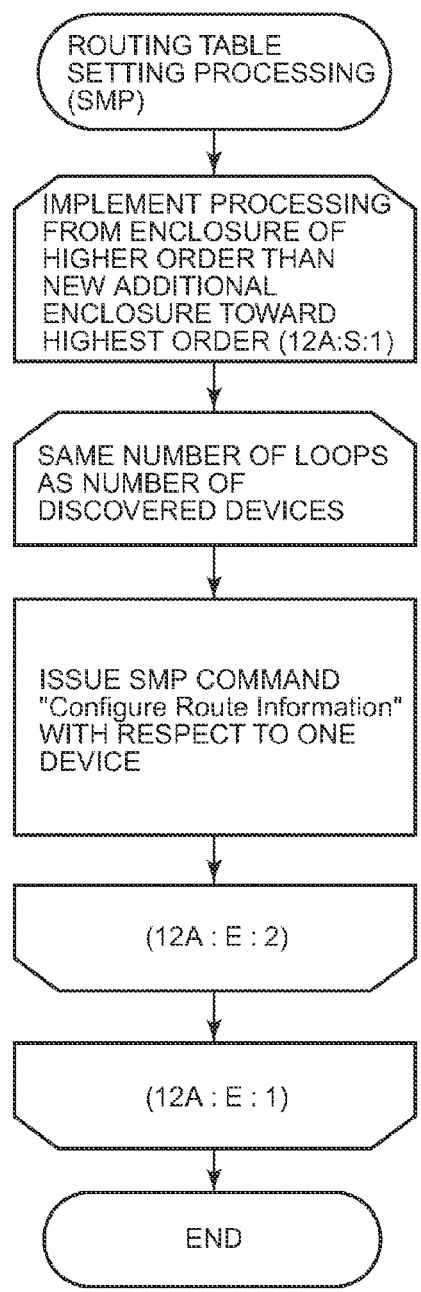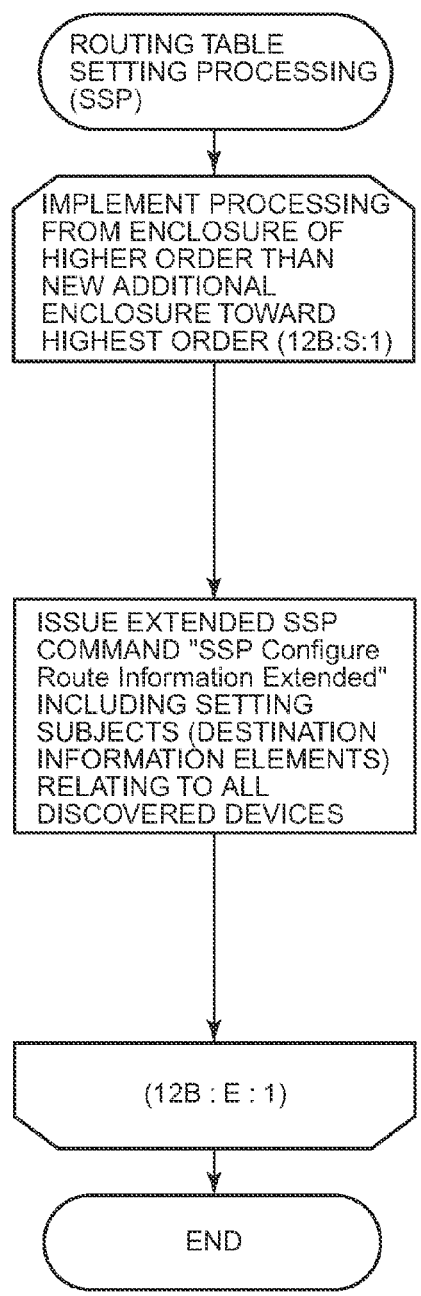

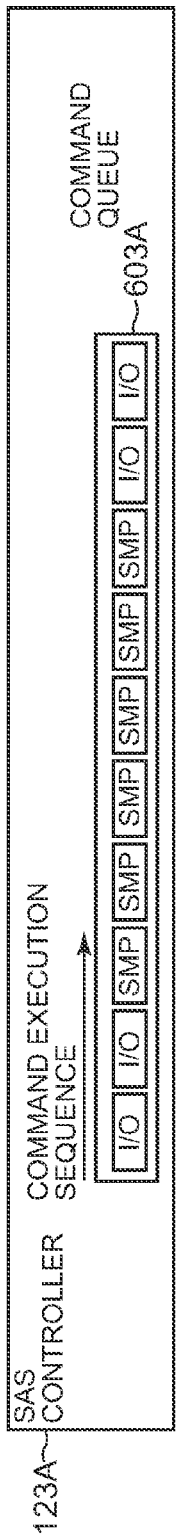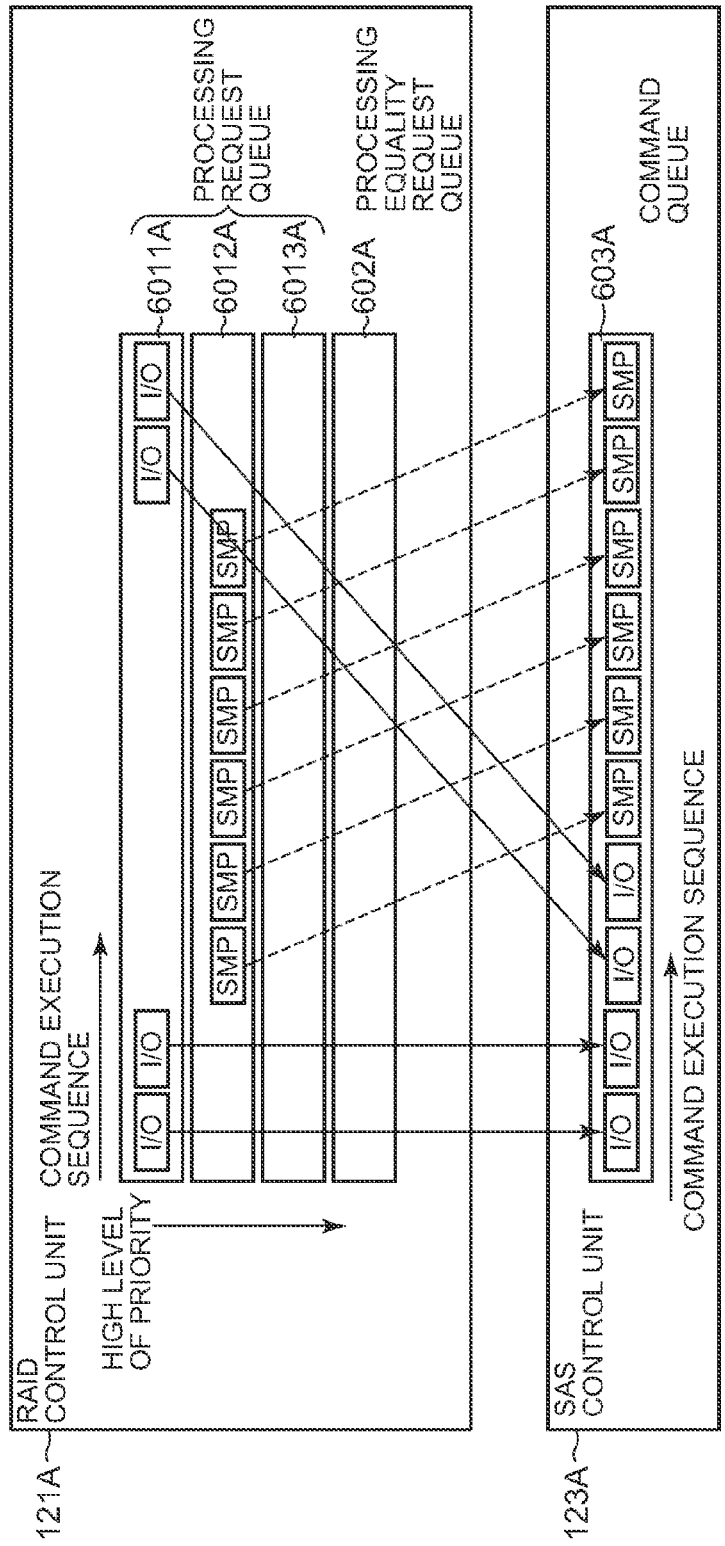
FIG. 14A
FIG. 14B

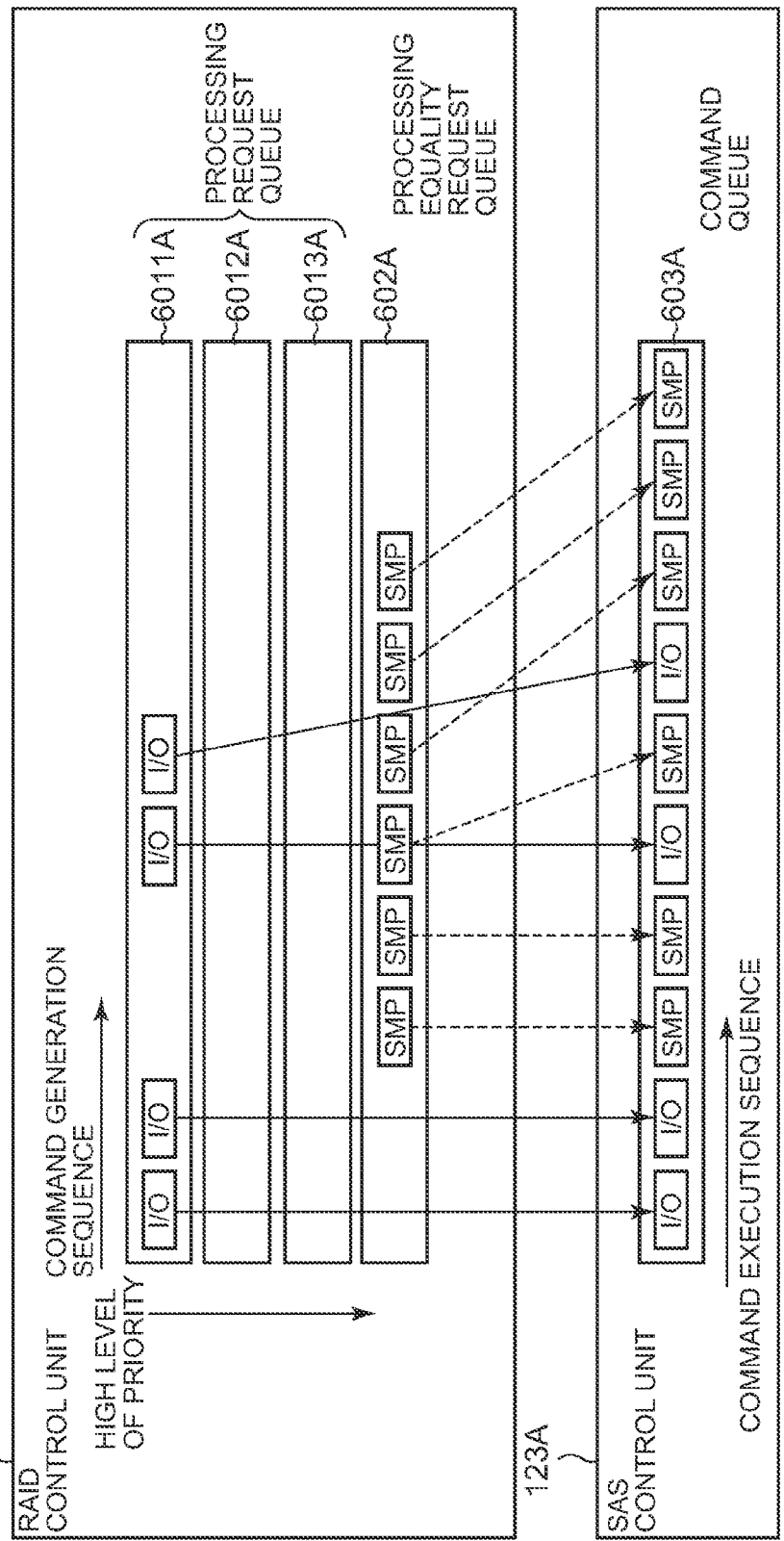

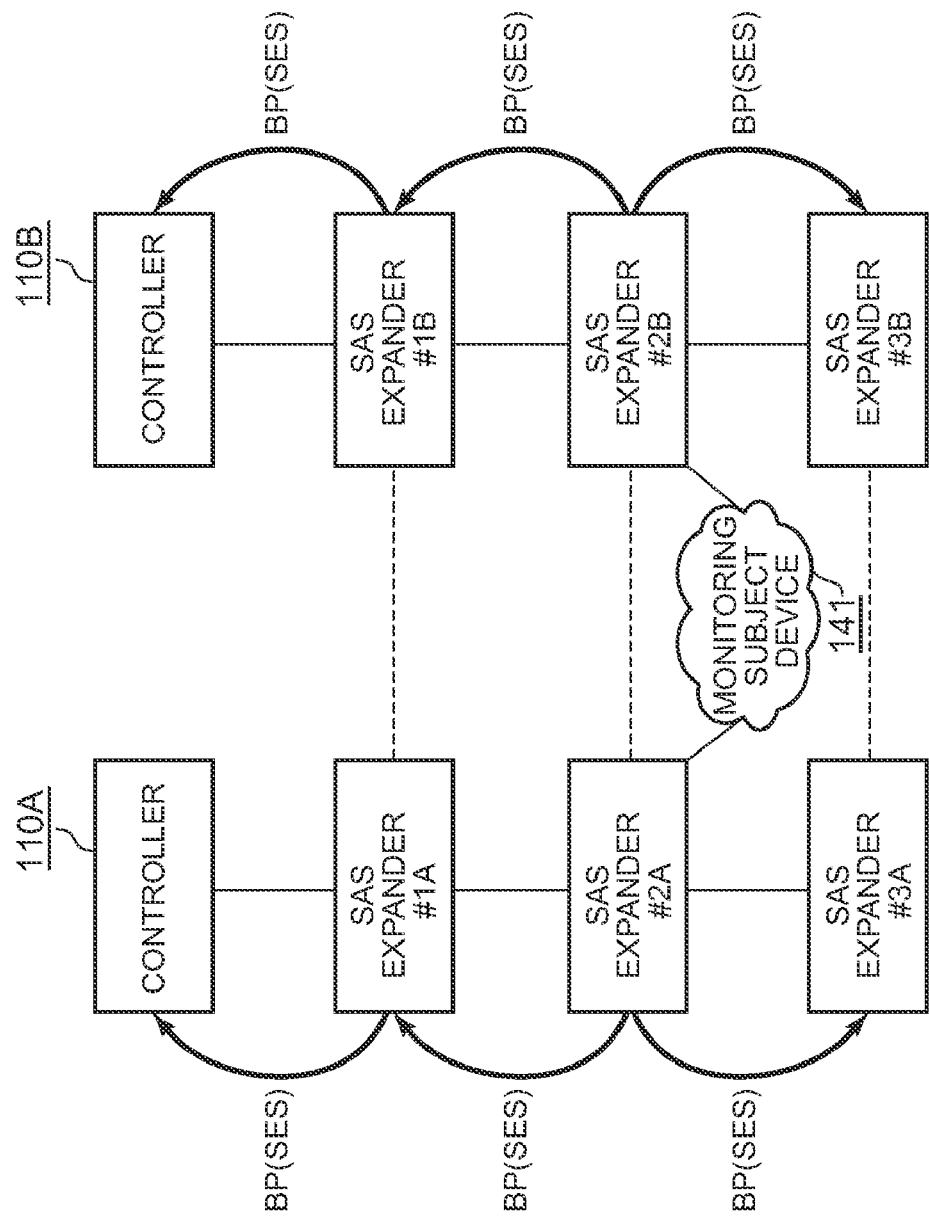

DATA STORAGE SYSTEM USING MULTIPLE COMMUNICATION PROTOCOLS

CROSS-REFERENCE TO PRIOR APPLICATIONS

This application is a continuation of U.S. patent application Ser. No. 12/007,641, filed on Jan. 14, 2008, which claims the benefit of Japanese Patent Application number 2007-83225, filed on Mar. 28, 2007, each of which is incorporated by reference as if fully set forth herein.

BACKGROUND

The present invention relates to a storage system.

Japanese Unexamined Patent Application Publication 2006-127217, for example, is known as an example of a technique relating to the notification of fault information, which is information relating to a fault in a storage system. According to Japanese Unexamined Patent Application Publication 2006-127217, when a fault is detected, a first storage system notifies a second storage system capable of communicating with the first storage system of fault information, whereupon the second storage system transmits the fault information received from the first storage system to a third storage system capable of communicating with the second storage system. The third storage system then notifies a host computer of the fault information received from the second storage system.

A storage system typically comprises a plurality of storage apparatuses, and a computer for receiving an I/O command from a high order apparatus and transmitting a data write or read command to one or more of the plurality of storage apparatuses in response to the I/O command.

SAS (Serial Attached SCSI) may be employed in the storage system as a communication I/F. In this case, an SAS expander is interposed between a controller and each storage apparatus as a switch device. In a case where the controller serves as the highest order apparatus, the SAS expanders are cascade-connected (for example, connected in series or in a tree structure) from the highest order to the lower orders, and one or more of the storage apparatuses is connected to each SAS expander.

As well as processing performed in response to an I/O command from a high order apparatus (high order I/O processing hereafter), processing performed in the storage system includes back end processing, which is executed irrespective of commands from high order apparatuses. Examples of back end processing include a discovery request, the setting of information in the SAS expanders, and the acquisition of fault information. In SAS, a command from the controller (initiator) to the SAS expander is typically transmitted using an SMP (Serial Management Protocol). However, with SMP, a command conforming to SMP (an SMP command hereafter) is issued to an SMP target expander (the SAS expander serving as the transmission destination of the SMP command), and while the SMP command is processed by the SMP target expander, resources (for example, one or more physical links and PHYs (physical ports) constituting a single pass from the controller to the SMP target expander) between the controller and the SMP target expander are occupied. While these resources are occupied, other commands cannot pass through the physical links and PHYs of the resources. As a result, the performance of the storage system may deteriorate.

Furthermore, in SAS, commands and responses are issued while a connection is established between the controller and target, but the connection between the controller and target may fail. Depending on the cause of the failure, the cause may be eliminated. It is therefore desirable that the cause of the connection failure be specified.

Moreover, various monitoring subject devices (for example, a thermometer, a fan, and a power source device) are provided in a storage system, and monitoring of the various monitoring subject devices is performed as back end processing. Monitoring may be executed by having the controller poll the various monitoring subject devices, but according to SAS standards, the device for executing the monitoring may be offloaded to an SAS expander of a lower order than the controller. The SAS expander monitors its own monitoring subject device, and when a change of state is detected in the device, for example, the SAS expander is able to broadcast a BP (SES) (BP is an abbreviation of "Broadcast Primitive") to higher order and lower order devices. However, in this case, the BP (SES) does not reach the controller when a fault or the like occurs in the connection between the SAS expander and its monitoring subject device or in the SAS expander itself.

The problems described above are not limited to a case in which SAS is used as a communication I/F in a storage system, and may also occur when other types of I/F are used.

SUMMARY

Hence, a first object of the present invention is to suppress deterioration of the performance of a storage system.

A second object of the present invention is to enable specification of the cause of a connection failure between a controller and a target in the storage system.

A third object of the present invention is to ensure that when a device of a lower order than the controller in the storage system monitors a monitoring subject device in the storage system, the result of the monitoring reaches the controller.

Other objects of the present invention will be clarified by the following description.

A plurality of storage apparatuses are connected to one or more switch devices connected in tier form (for example, connected in cascade form). A controller is connected to at least one of the one or more switch devices (for example, the highest order switch device).

In a first aspect, the controller transmits a second protocol command, which is defined as a command that corresponds to a first protocol command, to a target from among the one or more switch devices. In so doing, deterioration of the performance of the storage system can be suppressed. Incidentally, the first protocol command is a command that confirms to a first protocol. The first protocol is a type of protocol in which a connected established for transmitting a command to the target remains established during processing of the command by the target. The second protocol command is a command conforming to a second protocol. The second protocol is a type of protocol in which the connection is broken during processing of the command by the target.

In a second aspect, the controller may be provided with a command issuing unit for issuing commands, a plurality of queues in which issued commands accumulate, and a command issuing control unit for checking each of the plurality of queues and outputting the accumulated commands to the target. The command issuing unit may receive a first I/O command from an external apparatus, and issue a second I/O command in response to the first I/O command for causing one or more storage apparatuses from among the plurality of storage apparatuses to execute I/O. An accumulation destination queue may be selected depending on whether an issued command is the first protocol command or the second I/O command, and the command may be stored in the selected queue. In so doing, deterioration of the performance of the storage system can be suppressed.

In a third aspect, when a connection for transmitting the second protocol command to a target from among the one or more switch devices fails and/or a connection for transmitting a response to the second protocol command from the target fails, the controller tries to make a connection for transmitting the first protocol command to the target. When this connection is successful, it is assumed that the cause of the connection failure is a logical fault rather than a physical fault.

In a fourth aspect, the controller and the one or more switch devices are made redundant, the redundant switch devices are connected to each other, and each of the redundant switch devices is provided with a request interface and a monitoring control unit. The request interface is a broadcast request interface. The monitoring control unit monitors a monitoring subject device shared by the redundant switch devices, and when a fault is detected in the monitoring subject device, the monitoring control unit broadcasts a predetermined type of information to the high order and the low order and transmits a broadcast request to another switch device via the request interface. In this case, the monitoring control unit in the other switch device receives the broadcast request via the request interface in the other switch device. The monitoring control unit thereof then broadcasts a predetermined type of information to the high order and low order of the other switch device in response to the broadcast request. Thus, the result of monitoring the monitoring subject device reaches the other controller.

BRIEF DESCRIPTION OF THE DRAWINGS

FIG. 2A shows an example of the configuration of a basic enclosure;

FIG. 2B shows an example of the configuration of an additional enclosure;

FIG. 5A shows resource occupancy using SMP;

FIG. 5B shows resource occupancy using SSP;

FIG. 9 shows a relationship between an SMP function and an extended SSP command;

FIG. 10A shows an example of the configuration of an extended SSP command "SSP Discover Extended";

FIG. 10B shows an example of the configuration of a response to the extended SSP command "SSP Discover Extended";

FIG. 12A shows an example of the flow of routing table setting processing using an SMP command "Configure Route Information";

FIG. 12B shows an example of the flow of routing table setting processing using an extended SSP command "SSP Configure Route Information Extended";

FIG. 14A shows an example of a command queue in an SAS control unit, in which commands are arranged in order of the sequence in which the commands were issued by a RAID control unit;

FIG. 14B is an illustrative view of a first example of command issuing control;

FIG. 16 is an illustrative view of a third example of command issuing control;

FIG. 17 shows a normal case in which a BP (SES) reaches a controller;

DETAILED DESCRIPTION OF THE PREFERRED EMBODIMENT

Figure 1:
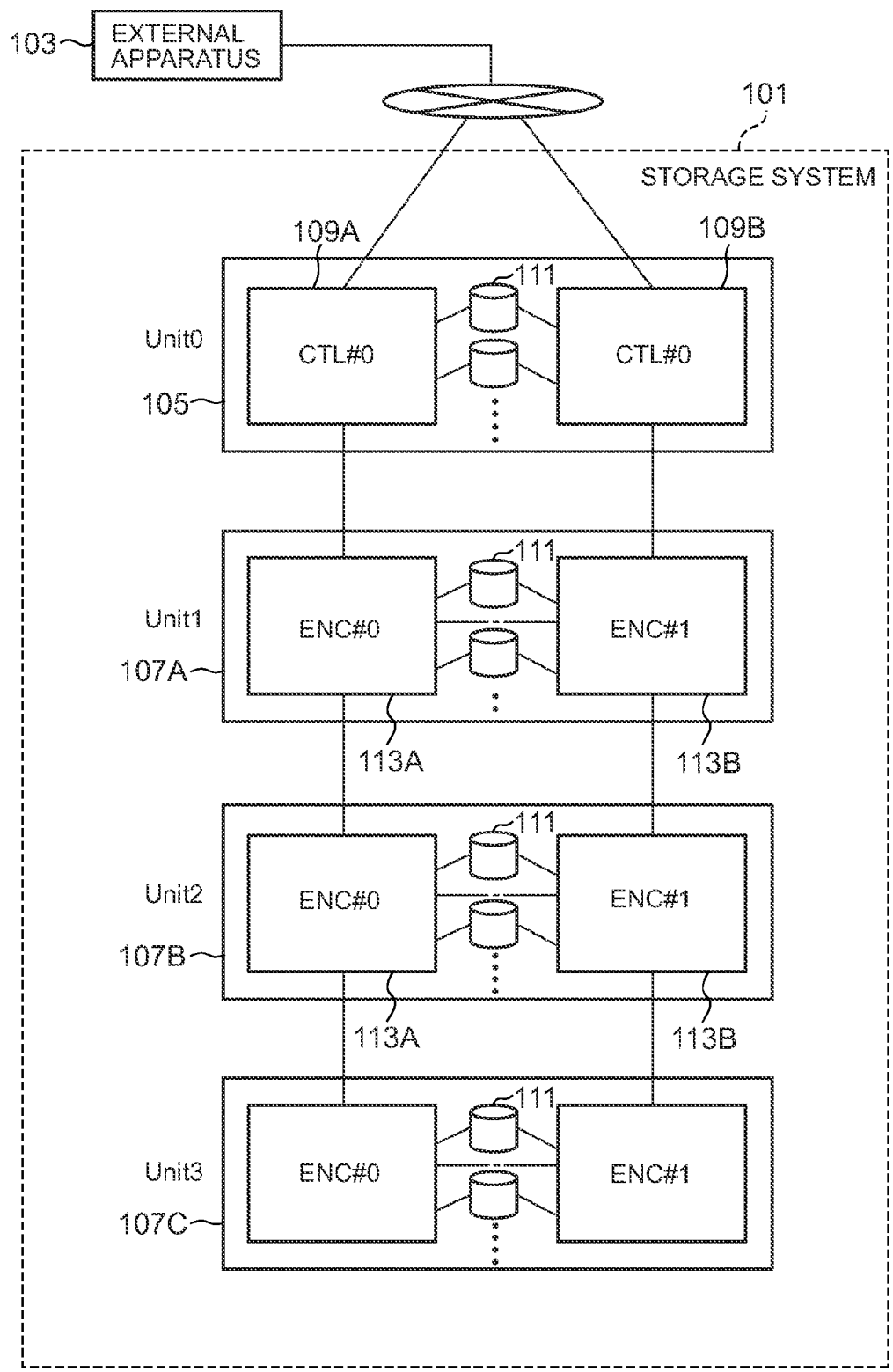
FIG. 1 shows an example of the configuration of a storage system according to an embodiment of the present invention.

A storage system comprises a plurality of storage apparatuses, one or more switch devices to which the plurality of storage apparatuses are connected, and a controller having a command issuing unit for issuing a command to a target from among the plurality of storage apparatuses and the one or more switch devices. The command issuing unit receives a first I/O command from an external apparatus (for example, a host computer or another storage system), and issues a second I/O command in response to the first I/O command to cause one or more storage apparatuses from among the plurality of storage apparatuses to execute data I/O. The controller and each of the one or more switch devices are capable of holding a routing table. Device information elements relating to devices that are connected to a switch device of a lower order than the controller are recorded in the routing table held by the controller. In the routing table held by the switch device, device information elements (for example, a destination information element to be described below) relating to devices that are connected to the switch device and a switch device of a lower order than the switch device are recorded. A device information element relating to a single device exists in the controller and each of the one or more switch devices at both of a first address that is referenced to make a connection when a command is issued under a first protocol, and a second address that is referenced to make a connection when a command is issued under a second protocol. In other words, when a connection is created using a certain switch device as a target, the device information elements at the first address corresponding to the certain switch device are referenced to make a connection for transmitting a first protocol command, and the device information elements at the second address corresponding to the certain switch device are referenced to make a connection for transmitting a second protocol command.

In one embodiment, the command issuing unit is capable of transmitting the second protocol command, which is defined as a command corresponding to the first protocol command, to a target from among the one or more switch devices. As noted above, the first protocol command is a command conforming to the first protocol. The first protocol is a type of protocol in which a connection established for transmitting a command to the target remains established during processing of the command by the target. The second protocol command is a command conforming to the second protocol. The second protocol is a type of protocol in which the connection is cut during processing of the command by the target.

In one embodiment, a second protocol discovery command for requesting the discovery of information relating to a device that is connected to a port of a switch device serving as the target serves as the second protocol command. Each switch device may comprise a command processing unit for interpreting and processing a command issued by the command issuing unit. When a second protocol discovery command is detected through interpretation of the command, the command processing unit is capable of creating a response including a plurality of port information elements corresponding respectively to all of a plurality of ports provided in the command processing unit, and transmitting the response to the command issuing unit.

In one embodiment, a second protocol table update command for requesting the updating of a routing table serves as the second protocol command. On the basis of the plurality of port information elements included in the received response, the command issuing unit is capable of preparing (for example, creating a command and establishing a state in which the command can be transmitted) a second protocol table update command including device information elements for all of the devices specified in the plurality of port information elements, and transmitting the second protocol table update command to a switch device of a higher order than the target switch device. This operation may be performed successively on the switch devices of a higher order than the target switch device from low order to high order or from high order to low order. Having detected the second protocol table update command through interpretation of the command, the command processing unit of the switch device of a higher order (i.e. closer to the controller) than the target switch device is capable of writing the device information elements included in the second protocol table update command in the routing table of the switch device. The routing table update performed in accordance with the second protocol table update command may be used to write device information elements relating to devices discovered in accordance with a discovery command issued under the first protocol collectively, for example.

In one embodiment, the command issuing unit is capable of trying to make a connection for transmitting the first protocol command when the connection for transmitting the second protocol command to the target fails and/or the connection for transmitting a response to the second protocol command from the target fails.

In one embodiment, when the connection with the target for transmitting the first protocol command is successful, the command issuing unit is capable of obtaining a routing table by issuing a first protocol command for obtaining the routing table of each switch device existing between the target and the controller, comparing the routing table held by the controller with the obtained routing table, and if a mismatch occurs, transmitting a first protocol command for correcting the obtained routing table to the switch device so that the routing tables match.

In one embodiment, when the connection with the target for transmitting a first protocol command is successful, the command issuing unit is capable of correcting the routing tables existing at a lower order than the controller in accordance with the first protocol command.

In one embodiment, when the connection for transmitting the second I/O command fails and/or the connection for transmitting a response to the second I/O command from the storage apparatus fails, the command issuing unit is capable of transmitting an enquiry to a switch device to which the storage apparatus is directly connected as to whether or not the storage apparatus is connected and/or whether or not the connection between the switch device and the storage apparatus is normal, in the form of the second protocol command. Furthermore, in this embodiment the controller and the one or more switch devices may be made redundant. In this case, when the command issuing unit of one controller receives information indicating that the storage apparatus is connected and/or the connection between the switch device and the storage apparatus is normal in response to the second protocol command of the enquiry, a second I/O command may be issued to the storage apparatus from another controller, and when the connection for transmitting the second I/O command is successful, the routing tables existing at a lower order than the one controller may be corrected in accordance with the first protocol command. Further, when the connection for transmitting the second I/O command fails and/or the connection for transmitting a response to the second I/O command from the storage apparatus fails, the command issuing unit of the other controller is capable of transmitting an enquiry to another switch device to which the storage apparatus is directly connected as to whether or not the storage apparatus is connected and/or whether or not the connection between the switch device and the storage apparatus is normal, in the form of a second protocol command. When the command issuing unit of the other controller receives information indicating that the storage apparatus is connected and/or the connection between the switch device and the storage apparatus is normal in response to the second protocol command of the enquiry, the routing tables existing at a lower order than the other controller may be corrected in accordance with the first protocol command.

In one embodiment, the controller and each of the one or more switch devices are made redundant. The redundant switch devices are connected to each other (for example, connected physically using cables or the like). Each of the redundant switch devices (SAS expanders, for example) may comprise a request interface (for example, hardware, a computer program, or a combination thereof) serving as a broadcast request (for example, a BP (SES) generated request, to be described below) interface, and a monitoring control unit for monitoring a monitoring subject device shared by the redundant switch devices, and when a fault is detected in the monitoring subject device, broadcasting a predetermined type of information (for example, the BP (SES) to be described below) to the high order and low order and transmitting a broadcast request to another switch device through the aforementioned request interface. The monitoring control unit in the other switch device is capable of receiving the broadcast request through the request interface of the other switch device, and broadcasting the predetermined type of information to the high order and low order of the other switch device in response thereto. Upon reception of the predetermined type of information, each of the redundant controllers is capable of transmitting the second protocol command to the switch device to obtain information relating to the fault detected in the switch device.

In one embodiment, the command issuing unit is capable of outputting the second I/O command in preference to the first protocol command. In this embodiment, when the first protocol command is a specific type of command, the priority level of the first protocol command may be made equal to the second I/O command. Also in this embodiment, when the first protocol command is a type of command that is issued at regular intervals, and two or more first protocol commands and two or more second I/O commands are issued respectively at an identical timing, the second I/O commands and first protocol commands may be output alternately.

Any two or more of the plurality of embodiments described above may be combined. At least one of all of the units described above may be constituted by hardware (circuits, for example), a computer program, or a combination thereof (such that a part of the unit is realized by a computer program and the remainder is realized by hardware, for example). The computer program is read and executed by a predetermined processor. Further, during information processing performed after the computer program is read by the processor, a storage area existing on a hardware resource such as memory may be used in an appropriate manner. Furthermore, the computer program may be installed on a computer from a recording medium such as a CD-ROM, or downloaded onto a computer via a communication network.

The storage system according to an embodiment of the present invention will be described in detail below with reference to the drawings.

[System Configuration]

FIG. 1 shows an example of the configuration of the storage system according to an embodiment of the present invention. In the following description, similar elements are allocated a reference symbol constituted by a combination of a parent number (107, for example) and a child symbol (A, B, or C, for example). When there is no particular need to differentiate between similar elements, description will be provided using only the parent number, and when it is necessary to differentiate between similar elements, description will be provided using a combination of the parent number and the child symbol.

A storage system 101 is constituted by a basic enclosure 105 and one or more (three, for example) additional enclosures 107A to 107C. The one or more additional enclosures 107 are connected in series to the basic enclosure 105.

Duplex controller devices 109A and 109B and a plurality of disk drives 111 are installed in the basic enclosure 105 (the disk drives 111 need not be provided in the basic enclosure 105). One or both of the controller devices 109A and 109B is capable of receiving an I/O command from a high order apparatus (for example, a host computer or another storage system) 103. The disk drive 111 is a hard disk drive installed with a SATA (Serial Attached SCSI) or SAS interface, for example. The disk drive 111 is not limited to a hard disk drive, and another type of storage apparatus (a flash memory drive, for example) may be employed.

Duplex enclosure devices 113A and 113B and a plurality of the disk drives 111 are installed in the additional enclosure 107. The enclosure devices 113A in each of the additional enclosures 107A to 107C are connected in series from one of the controller devices 109A. Similarly, the enclosure devices 113B in each of the additional enclosures 107A to 107C are connected in series from the other controller device 109B. More specifically, a plurality of SAS expanders are connected in series with a controller to be described below as the highest order. A configuration in which the controller and the plurality of SAS expanders are connected in series will be referred to hereafter as a "cascade configuration".

FIG. 2A shows an example of the configuration of the basic enclosure 105. Note that in the following description, to avoid confusion, an I/O command from an external apparatus 103 will be referred to as a "volume I/O command". The reason for this is that in an I/O command from the external apparatus 103, an ID (a LUN, for example) of a logical volume formed on the basis of the one or more disk drives 111 is typically specified. On the other hand, an I/O command issued to the disk drive 111 by the controller will be referred to as a "drive I/O command".

Of the duplex controller devices 109A and 109B, the controller device 109A will be described as a representative example.

The controller device 109A is a hardware circuit, for example. The controller device 109A is provided with a controller 110A and one SAS expander 131A (or a plurality thereof). The controller 110A comprises a RAID control unit 121A and an SAS control unit 123A. The RAID control unit 121A, SAS control unit 123A, and SAS expander 131A are connected in series from the high order to the low order.

The RAID control unit 121A is a module including a CPU for executing a computer program, for example, and executes command processing. More specifically, information (RAID configuration information hereafter) indicating the RAID level of a RAID group formed by two or more disk drives 111, the two or more disk drives 111 that form the RAID group, and the IDs of the logical volumes formed in the RAID group is stored in the storage resources (memory, for example) of the RAID control unit 121A, for example. In response to a volume I/O command from the external apparatus 103, the RAID control unit 121A specifies two or more disk drives 111 to correspond to the logical volume specified in the volume I/O command on the basis of the RAID configuration information, and generates two or more drive I/O commands corresponding respectively to the two or more specified disk drives 111. The RAID control unit 121A instructs the SAS control unit 123A to transmit the drive I/O commands to the disk drives 111 serving as the destinations of the drive I/O commands. The RAID control unit 121A is also connected to the other RAID control unit 121B, and is capable of instructing the other RAID control unit 121B to issue a drive I/O command to the disk drive 111.

The SAS control unit 123A is a hardware circuit (an IC chip, for example), for example. The SAS control unit 123A transmits the drive I/O commands from the RAID control unit 121A to the disk drives 111 indicated by the drive I/O commands in response to the instruction from the RAID control unit 121A.

A plurality of the disk drives 111 are connected to the SAS expander 131A. A drive I/O command transmitted from the SAS control unit 123A and destined for one of the disk drives 111 in the basic enclosure 105 is transmitted to the disk drive 111 via the SAS expander 131A. The SAS expander 131A in the additional enclosure 107 is connected to the SAS expander 131A in the basic enclosure 105.

FIG. 2B shows an example of the configuration of the additional enclosure 107.

In addition to the duplex enclosure devices 113A and 113B, the additional enclosure 107 is provided with a monitoring subject device (a power source device or a fan, for example) 141. The enclosure device 113A will be described as a representative example of the duplex enclosure devices 113A and 113B.

The enclosure device 113A is a hardware circuit, for example. The enclosure device 113A comprises one SAS expander 131A (or a plurality thereof), a monitoring subject device 133A that is monitored by the SAS expander 131A, flash memory 137A used by the SAS expander 131A, auxiliary memory 135A, and a PLD (Programmable Logic Device) 139A. In contrast to the monitoring subject device 133A, the monitoring subject device having the reference numeral 141 is monitored by both of the duplex SAS expanders 131A and 131B.

Of the monitoring subject devices 133, 141, the flash memory 137, the auxiliary memory 135, and the PLD 139 shown in FIG. 2B, the monitoring subject device 141 may be provided in the basic enclosure 105, and at least one of the monitoring subject device 133, flash memory 137, auxiliary memory 135, and PLD 139 may be provided in the controller device 109 of the basic enclosure 103, although this is not shown in FIG. 2A.

Figure 3:
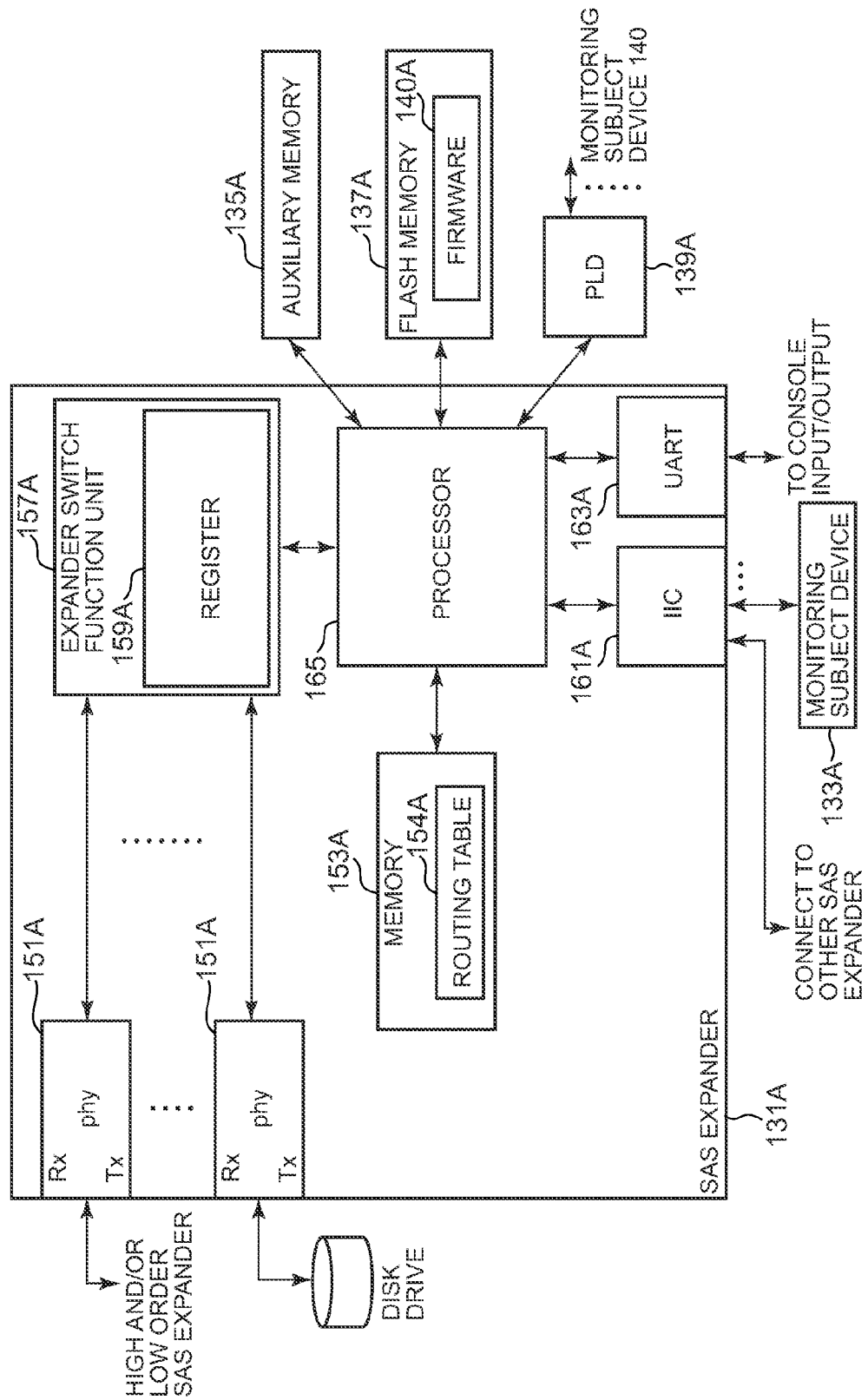
FIG. 3 shows an example of the configuration of an SAS expander.

FIG. 3 shows an example of the configuration of the SAS expander 131A. In FIG. 3, elements also existing in the other enclosure device 113B and the other SAS expander 131B are allocated reference symbols including the child symbol "A" (in other words, with respect to the other enclosure device 113B and the other SAS expander 131B, the child symbol "A" simply replaces "B"). Where appropriate, the elements of one cascade configuration will be described as representative examples.

The SAS expander 131A is an LSI (Large Scale Integration), for example. The SAS expander 131A comprises a plurality of PHYs 151A, an expander switch control unit 157A, a processor (a CPU, for example) 165A, memory 153A, a UART (Universal Asynchronous Receiver Transmitter) 163A, and an IIC (Inter Integrated Circuit) 161A.

The PHYs 151A are physical ports. Various devices, such as the disk drives 111 or the SAS expander 131A of another enclosure 105 or 107 may be connected to the PHYs 151A. Any number of PHYs 151A may be provided.

The expander switch control unit 157A is a hardware circuit for performing SAS I/F control and switch control. The plurality of PHYs 151A and the processor 165A are connected to the expander switch control unit 157A. The expander switch control unit 157A is provided with a register 159A. Switch control is performed on the basis of a routing table 154A.

As described above, the routing table 154A is stored in the memory 153A. Information elements (destination information elements) indicating a destination are recorded in the routing table 154A in relation to each device of a lower order than the SAS expander 131A comprising the table 154A and each device that is directly connected (connected by a single physical link) to the PHYs 151A of the SAS expander 131A. Typically, more and more destination information elements are recorded as the order of the SAS expander 131A in which the routing table 154A is stored becomes higher. The reason for this is that as the order of the SAS expander 131A becomes higher, more devices of a lower order exist. The routing table 154A is also held by both the RAID control unit 121A and the SAS control unit 123A, and because of this, the largest number of destination information elements (in other words, the destination information elements of all of the devices (SAS expanders 131A and disk drives 111) of a lower order) are recorded in the routing table 154A held by the RAID control unit 121A and SAS control unit 123A. The destination information element may be constituted by an address (SAS address) conforming to the SAS standards of the SAS expander and a PHY number.

The auxiliary memory 135A is used to supplement the storage resources of the memory 153A. More specifically, when the processor 165A expands the work area to the memory 153A, for example, such that the storage capacity is insufficient, the processor 165A expands the work area to the auxiliary memory 135A to cover the deficiency.

A computer program that is loaded onto and executed by the processor 165A is stored in the flash memory 137A. The computer program is firmware 140A, for example.

The PLD 139A is a device provided with the aim of increasing the number of GPIO (General Purpose Input/Output) ports. Monitoring of the monitoring subject device 141 and so on are performed via the ports of the PLD 139.

Input and output of information from a management terminal, not shown in the drawing, may be performed via the UART 163A, for example.

Monitoring of the monitoring subject device 133A is performed by the processor 165A for executing the firmware 140A via the IIC 161A. Further, the other SAS expander 131B is connected to the IIC 161A, and therefore communication with the other SAS expander 131B is possible via the IIC 161A.

Figure 4A:
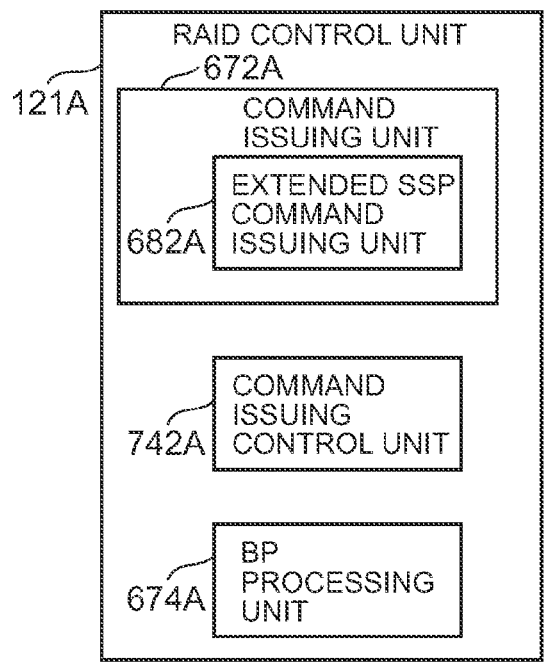
FIG. 4A shows a computer program executed by a processor in a RAID control unit.

FIG. 4A shows a computer program executed by a processor in the RAID control unit 121A. Hereafter, when a computer program is the subject of a sentence, it is assumed that in actuality processing is performed by the processor (CPU) that executes the computer program.

Examples of the computer program executed by the processor in the RAID control unit 121 include a command issuing unit 672A for executing command issuance processing, a command issuing control unit 742A for controlling command issuance from the command issuing unit 672A to the SAS control unit 123A, and a BP processing unit 674A for executing BP processing. A BP (Broadcast Primitive) is an information frame supported by SAS standards. Examples of a BP include a BP (SES) and a BP (CHANGE) (SES being an abbreviation of "SCSI Enclosure Service"). A BP (SES) is an information frame that is created and transmitted during monitoring of the monitoring subject device 133, 141 when a change of state is detected in the monitoring subject device 133, 141, for example. A BP (CHANGE) is an information frame that is created and transmitted when a change in the topology managed by the SAS expander 131 (for example, the addition or removal of a disk drive 111) is detected, for example.

An example of the command issuing unit 627A is an extended SSP command issuing unit 682A for issuing an extended SSP command. SSP is an abbreviation of "Serial SCSI Protocol". An extended SSP command is an SSP command replacing an SMP function. The extended SSP command will be described in detail below.

Figure 4B:
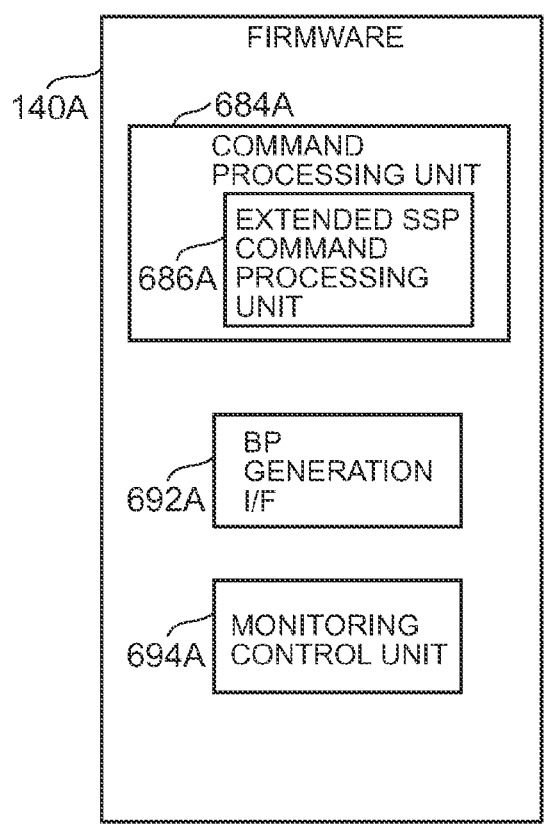
FIG. 4B shows an example of the configuration of firmware.

FIG. 4B shows an example of the configuration of the firmware 140A.

The firmware 140A comprises a command processing unit 684A for processing a received command, a BP instruction I/F 692A, which is an interface for receiving a BP generation request from the other SAS expander 131B and requesting the other SAS expander 131B to generate a BP, and a monitoring control unit 649A for monitoring the monitoring subject devices 133A, 141, for example. The command processing unit 684A may be an extended SSP command processing unit 686 for interpreting and executing the extended SSP command. The processing of the firmware 140A will be described in detail below.

[Differences Between Characteristics of SMP and Characteristics of SSP]

This embodiment focuses on differences between the characteristics of SMP and the characteristics of SSP, and accordingly, SMP commands and SSP commands are used separately.

First, the characteristics of SMP will be described with reference to FIG. 5A.

As shown in FIG. 5A, according to SMP, a connection is established between the SAS control unit 123 and an SMP target expander #3 (the third low order SAS expander 131), a command (an SMP command) conforming to SMP is issued to the SMP target expander #3 from the SAS control unit 123, the SMP command is processed by the SMP target expander #3, a response (an SMP response) is prepared as a result of the processing (for example, the response is created and held in memory or the like temporarily), the SMP response is transmitted to the SAS control unit 123 from the SMP target expander #3, and until the connection is broken, the resources between the SAS control unit 123 and the SMP target expander #3 (for example, one or more physical links 162 and PHYs constituting a single pass between the SAS control unit 123 and the SMP target expander #3, as shown by the ellipse outlined by a dotted line frame) are occupied. While the resources are occupied, other commands are unable to pass through the physical links 162 and PHYs of the resources. Further, the resource occupancy length is affected by the performance of the SMP target expander #3. This is because during processing of the SMP command, the SAS control unit 123 and the SAS target expander #3 are in a connected state (i.e. a resource occupied state). Hence, when the performance of the SAS target expander #3 is poor such that a long time is required to process the SMP command, for example, the resource occupancy length increases correspondingly.

Further, only one SMP command can be issued from the SAS control unit 123 at one time, and when a single SMP command is issued such that the resources are occupied thereby, for example, another SMP command cannot be transmitted.

Furthermore, in the case of SMP, as long as the SMP command reaches the target (here, the SAS expander #3), the SMP response is guaranteed to be returned to the SAS control unit 123 from the target, excluding special cases such as the occurrence of a physical fault in the resources between the SAS control unit 123 and target.

Next, the characteristics of SSP will be described with reference to FIG. 5B.

As shown in FIG. 5B, according to SSP, a connection is established between the SAS control unit 123 and an SSP target expander #3 (the third low order SAS expander 131), a command (an SSP command) conforming to SSP is issued to the SSP target expander #3 (the third low order SAS expander 131) from the SAS control unit 123, and when the SSP command reaches the SSP target expander #3, the connection is broken by the SSP target expander #3. When processing of the SSP command is complete, the SSP target expander #3 is reconnected to the SAS control unit 123 (in other words, the connection is re-established), and a response (an SSP response) to the SSP command is returned to the SAS control unit 123 from the SSP target expander #3. The connection is then broken.

In other words, according to SSP, during processing of the SSP command, the resources between the SAS control unit 123 and the SSP target expander #3 are released. Hence, in contrast to SMP, with SSP another command (a drive I/O command, for example) can be transmitted through the resources during command processing.

However, in the case of SSP, after the SSP command has reached the target and the connection has been broken, reconnection is not always successful. The reason for this is that during SSP command processing, a topology fault may occur (typically, a defect occurs in the routing table 154 held by the SAS control unit 123 or the routing table 154 held by an SAS expander 131 between the SAS control unit 123 and the target).

Thus, there are drawbacks and advantages in both the characteristics of SMP and the characteristics of SSP. Hence, in this embodiment, SMP commands and SSP commands are used separately, focusing on the differences between the characteristics of SMP and the characteristics of SSP.

[First Topology Fault Specification]

Figure 6:
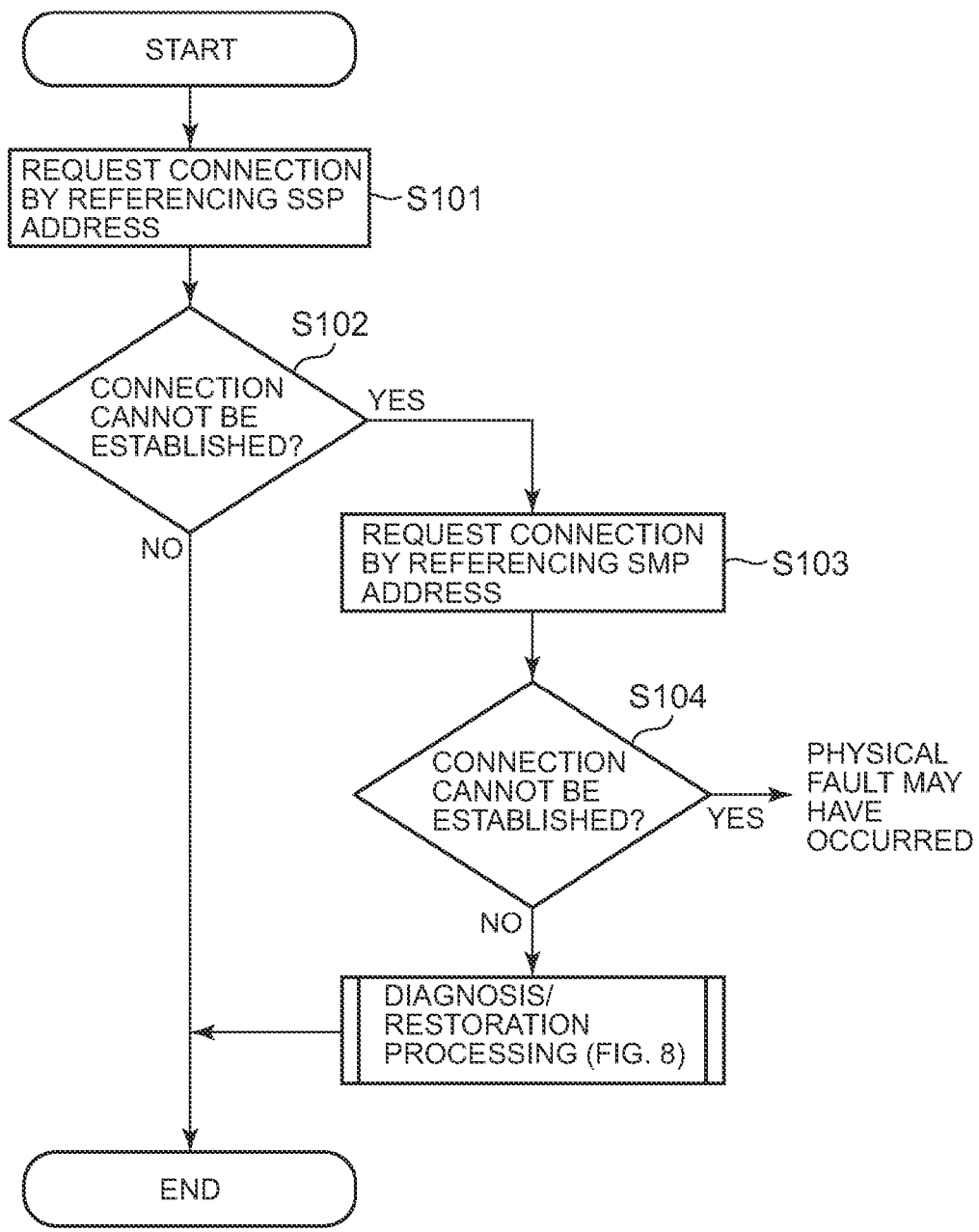
FIG. 6 shows the flow of processing executed when an SSP command is issued to the SAS expander.

FIG. 6 shows the flow of processing executed when an SSP command is issued to the SAS expander 131A. Note that in the following description, the target SAS expander will be referred to as a "target expander".

The command issuing unit 672A of the RAID control unit 121A looks up an SSP address (an address in the routing table 154A held by the RAID control unit 121A) corresponding to the target expander 131A, and issues a connection request to the SAS control unit 123A using an SAS address indicated by the destination information element located at the SSP address (S101). Addresses used when referencing the routing table 154A held by the RAID control unit 121A are provided in the routing table 154A, and an SSP address and SMP address are provided for each SAS expander. In other words, when connecting to an SAS expander, the reference destination address differs depending on whether the connection is for transmitting an SSP command or for transmitting an SMP command.

In response to the connection request, the SAS control unit 123A tries to make a connection with the target expander 131A having the specified SAS address. More specifically, the SAS control unit 123A references its own routing table 154A to find the nearest SAS expander 131A for connecting to the target expander 131A, and instructs this SAS expander 131A to make a connection. Thereafter, the physical links are secured in succession from the SAS expander 131A toward the low order (in bucket brigade form). The physical links are secured by the SAS expander 131A that secures the physical links using the routing table 154A held thereby. When the physical links are secured from the high order physical link to the physical link connected to the target expander 131A, the connection is deemed successful (the connection is established).

When a connection failure occurs, or more specifically when a connection is not established with the target expander 131A or the connection for issuing an SSP command from the command issuing unit 672A is successful but reconnection is not achieved within a fixed amount of time after the connection is broken following arrival of the SSP command (S102: YES), a topology fault may have occurred, and therefore the routine advances to S103. On the other hand, when the connection is successful (S102: NO), it is assumed that a topology fault has not occurred, and the routine is terminated.

In S103, the command issuing unit 672A looks up an SMP address (an address in the routing table 154A held by the RAID control unit 121A) corresponding to the target expander 131A, and issues a connection request using an SAS address indicated by the destination information element located at the SMP address. If a connection with the target expander 131 is still not established (S104: YES), a physical defect (a hardware defect) may have occurred, and therefore the command issuing unit 672A executes specific error processing to inform a manager thereof, for example. When a connection is established in S103, it is likely that the SSP command cannot be transmitted due to a topology fault, and therefore the command issuing unit 672A executes diagnosis/restoration processing shown in FIG. 8.

Regardless of whether a connection request is issued to an SAS address indicated by a destination information element obtained from an SSP address or a connection request is issued to an SAS address indicated by a destination information element obtained from an SMP address, routing processing using the routing tables 154A held respectively by the SAS control unit 123A and SAS expander 131A existing between the RAID control unit 121A and target expander 131A is executed in the SAS control unit 123A and SAS expander 131A. When an error exists in the routing tables 154A, a connection failure occurs.

In other words, when a connection using the destination information element located at the SSP address fails but a connection using the destination information element located at the SMP address succeeds, the reason for this is that the SSP address and SMP address of the same SAS expander differ from each other, and therefore, even if the destination information element located at the SSP address is broken, the destination information element at the SMP address may not be broken and the content thereof may be correct.

A drive I/O command is issued using SSP. However, topology fault specification may also be performed in this case. Note, however, that drive I/O commands are only transmitted by SSP, and therefore no SMP address exists. Nevertheless, using the measures described below, it is possible to specify the topology fault.

[Second Topology Fault Specification]

Figure 7:
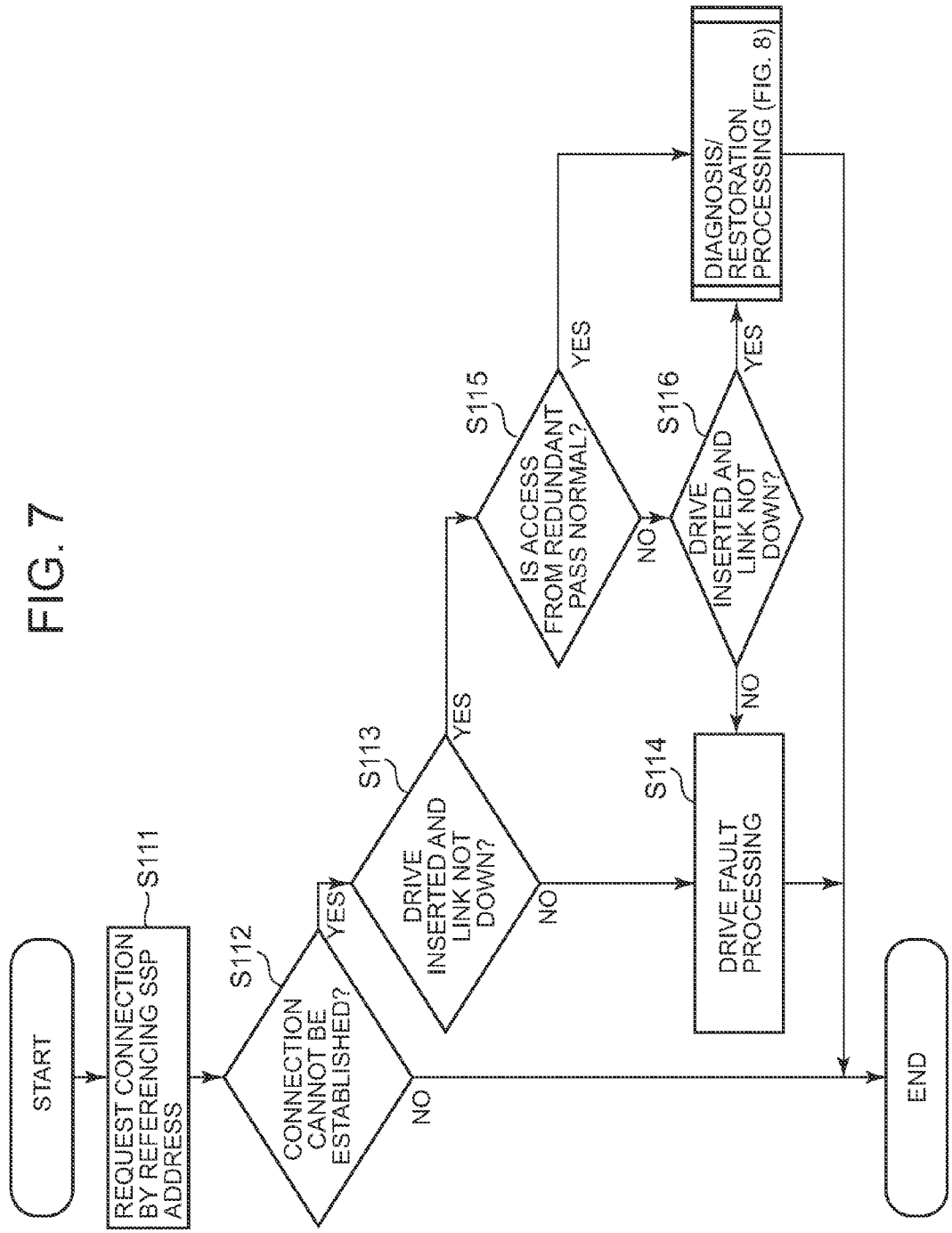
FIG. 7 shows the flow of processing executed when a drive I/O command is issued to a disk drive using SSP.

FIG. 7 shows the flow of processing executed when a drive I/O command is issued to the disk drive 111 using SSP. Note that in the following description, the target disk drive will be referred to as a "target drive".

The command issuing unit 672A of the RAID control unit 121A looks up an address corresponding to the target drive 111 in the routing table 154A, and issues a request to connect to the target drive 111 using the destination information element located at the address (S111).

If a connection cannot be made (S112: YES), a topology fault may have occurred, and therefore the routine advances to S113. On the other hand, when a connection can be made (S112: NO), it is assumed that a topology fault has not occurred, and the routine is terminated.

In S113, the command issuing unit 672A determines whether or not the target drive 111 is inserted and whether or not a link (physical link) between the target drive 111 and the SAS expander (referred to hereafter for convenience as a "target expander" in relation to FIG. 7) 131A serving as the connection destination thereof is down. More specifically, for example, the extended SSP command issuing unit 682A of the command issuing unit 672 transmits an extended SSP command serving as an enquiry as to whether or not the target drive 111 is inserted or a link is down to the target expander 131A (the SAS expander 131A to which the target drive 111 is connected by a single physical link). By analyzing the response to the extended SSP command, it is possible to determine whether or not the target drive 111 is inserted and whether or not the link between the target drive 111 and the target expander 131A is down. When it is determined that the disk drive 111 is inserted and the link is not down (S113: YES), the routine advances to S115, and when it is determined that the disk drive 111 is not inserted or that the link is down (S113: NO), the routine advances to S114.

In S114, the command issuing unit 672A executes drive fault processing. Here, drive fault processing is processing for determining whether the fault generation site is the target drive 111 or the target expander 131A. More specifically, for example, the extended SSP command issuing unit 682A of the command issuing unit 672A is capable of issuing an extended SSP command serving as an enquiry as to whether the fault generation site is the target drive 111 or the target expander 131A to the target expander 131A, receiving a response to the extended SSP command, and specifying the fault generation site by analyzing the response. The command issuing unit 672A is capable of recording information indicating the specified fault generation site in the memory of the RAID control unit 121A or informing a management terminal, not shown in the drawing, of the information, for example.

Figure 8:
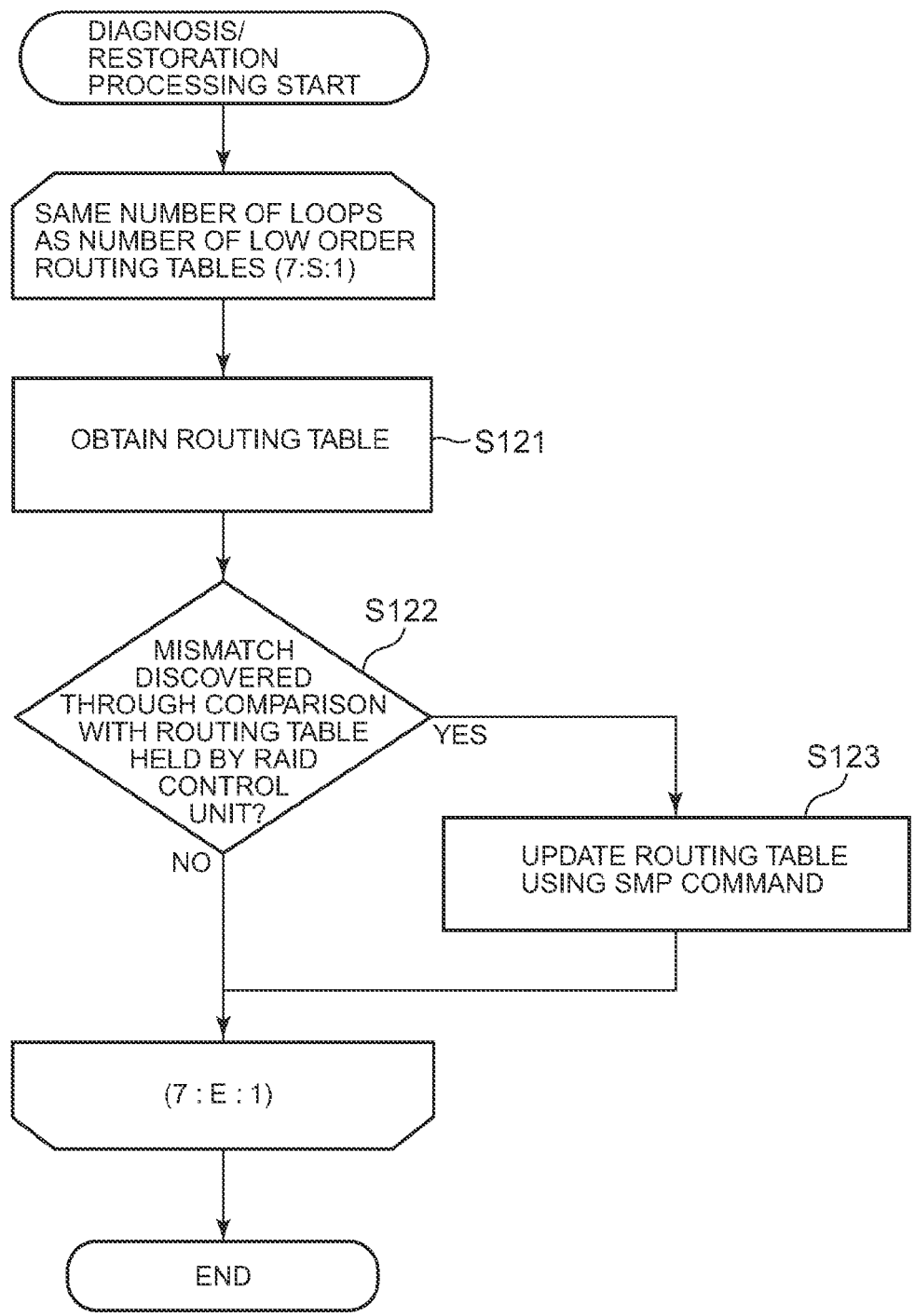
FIG. 8 shows the flow of diagnosis/restoration processing.

In S115, the command issuing unit 672A determines whether or not access from a redundant pass is normal. For example, the command issuing unit 672A instructs the other RAID control unit 121B to issue a drive I/O command to the target drive 111. In response to this instruction from the RAID control unit 121A, the other RAID control unit 121B is capable of issuing a request for connection to the target drive 111 using the routing table 154A held by the RAID control unit 121B, and transmitting a response indicating whether the connection has succeeded or failed to the RAID control unit 121A. When the response indicates a successful connection, the command issuing unit 672A determines that access is normal, and when the response indicates a connection failure, the command issuing unit 672A determines that access is not normal. When access is determined to be normal (S115: YES), the diagnosis/restoration processing of FIG. 8 is executed, and when access is not normal (S115: NO), S116 is executed.

In S116, the command issuing unit 672A determines whether or not the target drive 111 is inserted and whether or not a link between the target drive 111 and the other target expander 131B serving as the connection destination thereof is down. When it is determined that the disk drive 111 is inserted and the link is not down (S116: YES), the diagnosis/restoration processing of FIG. 8 is executed, and when it is determined that the disk drive 111 is not inserted or that the link is down (S116: NO), the routine advances to S114. In this case, the other SAS expander 131B serves as the target in S114.

When YES is obtained in S115, a topology fault may have occurred in one of the cascade configurations. When YES is obtained in S116, a topology fault may have occurred in both of the cascade configurations. In either case, the topology fault can be eliminated through the diagnosis/restoration processing of FIG. 8.

Further, when a connection for transmitting an enquiry using an SSP command cannot be made in the processing of FIG. 7, the routine may advance to S103 in FIG. 6.

[Diagnosis/Restoration Processing]

FIG. 8 shows the flow of diagnosis/restoration processing. Note that in the drawing, the start and end of the loop are expressed as "drawing number; S or E; loop number". This applies likewise to the other drawings (FIG. 11, for example).

S121, S122, and S123 are executed once for each of the routing tables 154A existing at a lower order than the RAID control unit 121A (for example, the sum total of the SAS control unit 123A and SAS expander 131A), for example. Further, S121, S122, and S123 are executed in succession in bucket brigade form from the RAID control unit 121A toward the low order.

In S121, the RAID control unit 121A obtains the routing table 154A in the SAS control unit 123A or the routing table 154A in the SAS expander 131A. More specifically, the command issuing unit 672A issues an SMP command for obtaining the routing table 154A to the SAS control unit 123A or the SAS expander 131A. Having received the SMP command, the SAS control unit 123A or SAS expander 131A transmits the routing table 154A held thereby to the RAID control unit 121A in response to the SMP command. Note that when there is a possibility of a topology fault in the redundant pass (the other cascade configuration), for example, (in other words, when the diagnosis/restoration processing is executed from S116: YES in FIG. 7), the diagnosis/restoration processing can be performed by issuing an instruction from the RAID control unit 121A to the other RAID control unit 121B in the other cascade configuration, for example.

In S122, the RAID control unit 121A compares the routing table (to be referred to hereafter as a "first table" in relation to FIG. 8) in its own memory (not shown) with the obtained routing table (to be referred to hereafter as a "second table" in relation to FIG. 8) 154A, and determines whether or not any part (destination information element) of the obtained second table 154A does not match the first table. When it is determined that a mismatch exists, the routine advances to S123, and when it is determined that no mismatches exist, S121 is executed in relation to the SAS expander 131A at one lower order.

In S123, the command issuing unit 672A of the RAID control unit 121 transmits an SMP command for writing the second table 154A to the SAS expander 131A from which the second table 154A was obtained. In so doing, the defect in the second table 154A in the SAS expander 131 is corrected. As long as the second table 154A can be restored to its correct form, the writing subject of the SMP command may be a correct, non-defective second table 154A created on the basis of the first table, or only the information element for correcting the mismatching part.

[Extended SSP Command]

In this embodiment, a plurality of SSP commands replacing each of a plurality of SMP functions are prepared. Each of the plurality of SSP commands is referred to as an "extended SSP command" in the description of this embodiment.

FIG. 9 shows the relationship between SMP functions and extended SSP commands.

For example, nine types of extended SSP commands are prepared, and the relationship between each type of extended SSP command and each SMP function is as shown in the drawing. The extended SSP command issuing unit 682 (see FIG. 4A) in the command issuing unit 672 of the RAID control unit 121 creates and issues the extended SSP commands shown in the drawing, and the extended SSP command processing unit 686 (see FIG. 4B) in the firmware 140 of each SAS expander 131, having received an extended SSP command, executes processing corresponding to the type of the received extended SSP command, creates a response to the extended SSP command, and transmits the response back to the extended SSP command issuing unit 682.

In the following description, an extended SSP command "SSP Discover Extended", which replaces the SMP function DISCOVER, will be used as a representative example.

FIG. 10A shows an example of the configuration of the extended SSP command "SSP Discover Extended".

The extended SSP command "SSP Discover Extended" is constituted by six bytes, for example.

"B2H", for example, is set in a certain byte position ("2", for example) of the extended SSP command "SSP Discover Extended" as a page code. "B2H" is one of a plurality of vendor unique codes determined in accordance with SSP specifications within SAS standards. Hence, the code set as the page code is not limited to "B2H", and any other vendor unique code may be used.

The data size of the response to the command is recorded within a predetermined range (for example, byte positions "3" to "5") of the extended SSP command "SSP Discover Extended". In this embodiment, the data size of the response is fixed, and therefore a predetermined data size is set in the predetermined range when "B2H" is set in the page code.

FIG. 10B shows an example of the configuration of a response to the extended SSP command "SSP Discover Extended".

The number of PHYs (37, for example) is recorded in a certain byte position ("008H", for example) of the response to the extended SSP command "SSP Discover Extended". PHY information elements "PHY INFORMATION" are recorded within a predetermined range of the response to the extended SSP command "SSP Discover Extended" in an identical number to the number of PHYs (37, for example). Each of the PHY information elements "PHY INFORMATION" included in the response shown in FIG. 10B may be made substantially identical to a single PHY information element that can be received when a discovery request is issued in the form of a single SMP command.

Representative examples of the extended SSP command "SSP Discover Extended" and the response thereto were described above. However, the other types of extended SSP commands and/or responses thereto are also set with a plurality of information elements that are exchanged one at a time in an SMP command. In other words, this embodiment focuses on the characteristics of SSP, and by amending the configurations of the computer program (command issuing unit 672) executed by the RAID control unit 121 and the firmware 140 executed by each SAS expander 131, processing that is executed by issuing an SMP command and receiving a response thereto a plurality of times can be executed by issuing an extended SSP command and receiving a response thereto only once.

[Discovery Processing and Routing Table Setting Processing]

A new additional enclosure 107 can be added to the storage system 101 when a volume I/O command has been received from the external apparatus 103. Hereafter, the added additional enclosure 107 will be referred to as a "new additional enclosure 107". When the new additional enclosure 107 is added (for example, when the SAS expanders 131A and 131B in the new additional enclosure 107 are electrically connected, for example, to the lowest order SAS expanders 131A and 131B), information relating to the devices to which the SAS expanders 131A and 131B are connected must be recorded in all of the routing tables of a higher order than the new additional enclosure 107 so that the RAID control units 121A and 121B can access the devices connected to the SAS expanders 131A and 131B in the new additional enclosure 107.

Having detected that the new additional enclosure 107 has been added, the RAID control units 121A and 121B execute discovery processing. More specifically, the RAID control units 121A and 121B request the disclosure of information from the SAS expanders 131A and 131B in the new additional enclosure 107 indicating the devices connected thereto, and receive this information in response. Then, on the basis of the information received in response to the request, the RAID control units 121A and 121B execute routing table setting processing to update all of the routing tables of a higher order than the new additional enclosure 107.

Figure 11A:
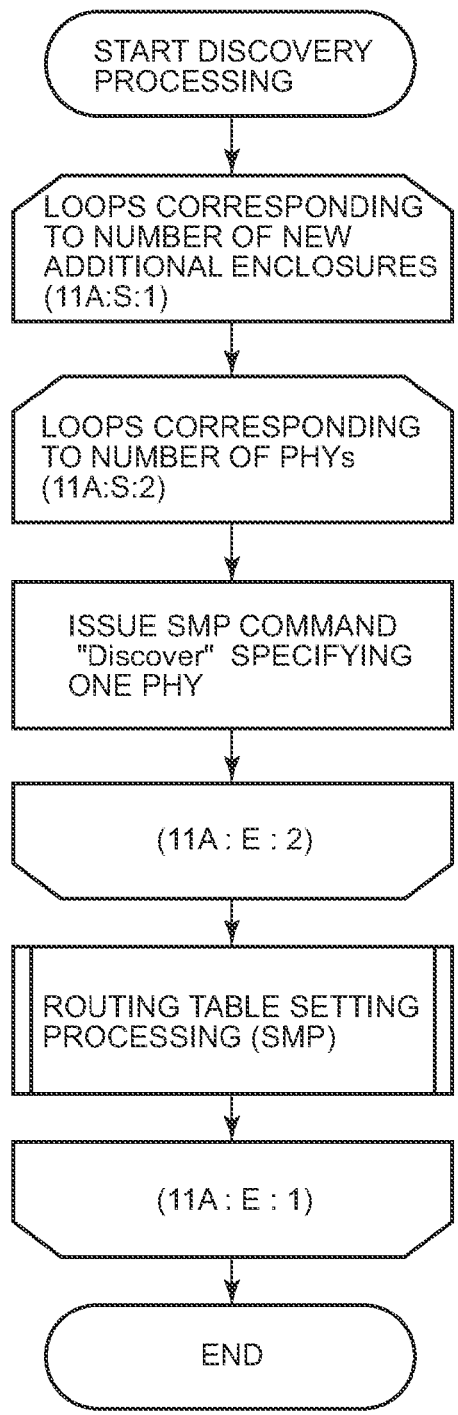
FIG. 11A shows an example of the flow of discovery processing using an SMP command "DISCOVER"

Typically, SMP is used as a discovery processing method. More specifically, as shown in FIG. 11A, in discovery processing a discovery SMP command "DISCOVER" is issued. Only one PHY can be specified in the SMP command "DISCOVER", and therefore, only one PHY information element can be obtained when a single SMP command "DISCOVER" is issued (in other words, an information element relating to a device connected to the specified PHY is obtained). Hence, in terms of a single cascade configuration, the SMP command "DISCOVER" is issued in an identical number to the number of PHYs provided in the SAS expander 131A of a single recognized new additional enclosure 107.

When the PHY information elements of all of the PHYs in the single recognized new additional enclosure 107 have been obtained, the routing table setting processing is executed according to FIG. 11A, and typically, SMP commands are also used in the routing table setting processing. More specifically, as shown in FIG. 12A, an SMP command "Configure Route Information" for setting the information elements recorded in the routing table is issued. The number of destination information elements that can be set in the routing table 154A using the SMP command "Configure Route Information" corresponds to a single device, which corresponds to a single PHY information element. Hence, in terms of a single cascade configuration and in relation to the single new additional enclosure 107, the SMP command "Configure Route Information" is issued to a single SAS expander 131A of a higher order than the new additional enclosure 107 in an identical number to the number of obtained PHY information elements (i.e. the number of discovered devices). This operation is executed for all of the SAS expanders 131A of a higher order than the new additional enclosure 107 one at a time in succession from the low order to the high order.

Figure 13A:
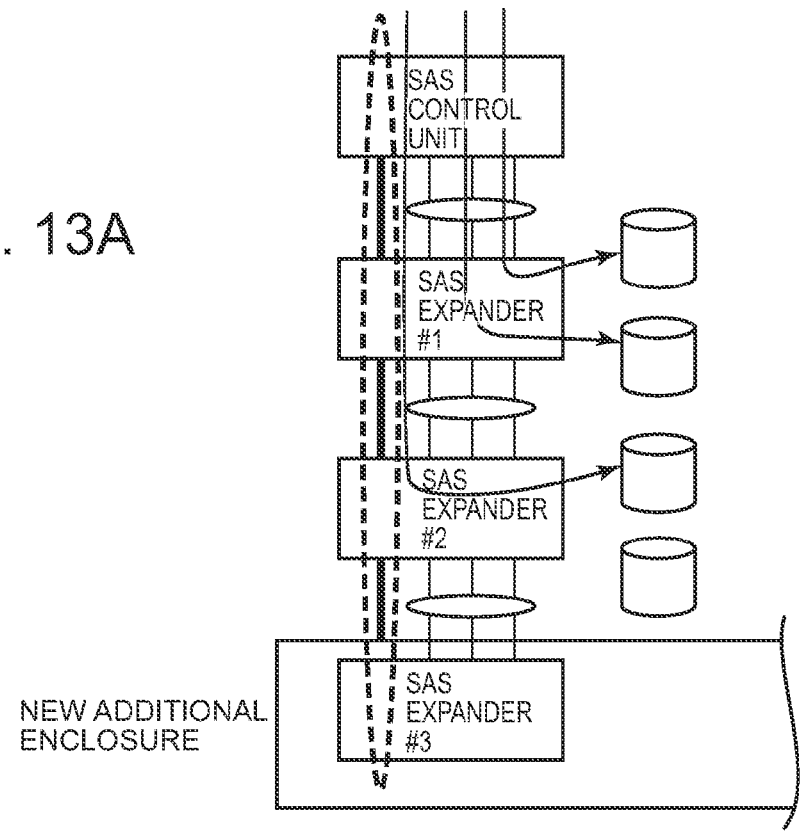
FIG. 13A shows a situation occurring during discovery processing or routing table setting processing using an SMP command in which resources are occupied during processing of the SMP command such that physical links allowing the passage of a drive I/O command are limited.

In discovery processing and routing table setting processing using SMP commands, the number of issued commands depends on the number of PHYs and the number of discovered devices. Hence, as the number of PHYs and the number of discovered devices increases, the number of issued SMP commands increases. A new additional enclosure is added when a volume I/O command is received from the external apparatus 103, and therefore, during discovery processing and routing table setting processing, the number of physical links through which a drive I/O command issued on the basis of the volume I/O command can be transmitted decreases in accordance with the amount of resources occupied by SMP command issuance, processing, and so on (see FIG. 13A).

Hence, in this embodiment, discovery processing and routing table setting processing are performed using SSP. More specifically, as shown in FIG. 9, "SSP Discover Extended" is prepared as an extended SSP command replacing the SMP command "DISCOVER", and "SSP Configure Route Information Extended" is prepared as an extended SSP command replacing the SMP command "Configure Route Information". The extended SSP issuing unit 682 is configured to be able to issue these extended SSP commands, and the firmware 140 is configured to be able to interpret and execute the extended SSP commands.

Figure 11B:
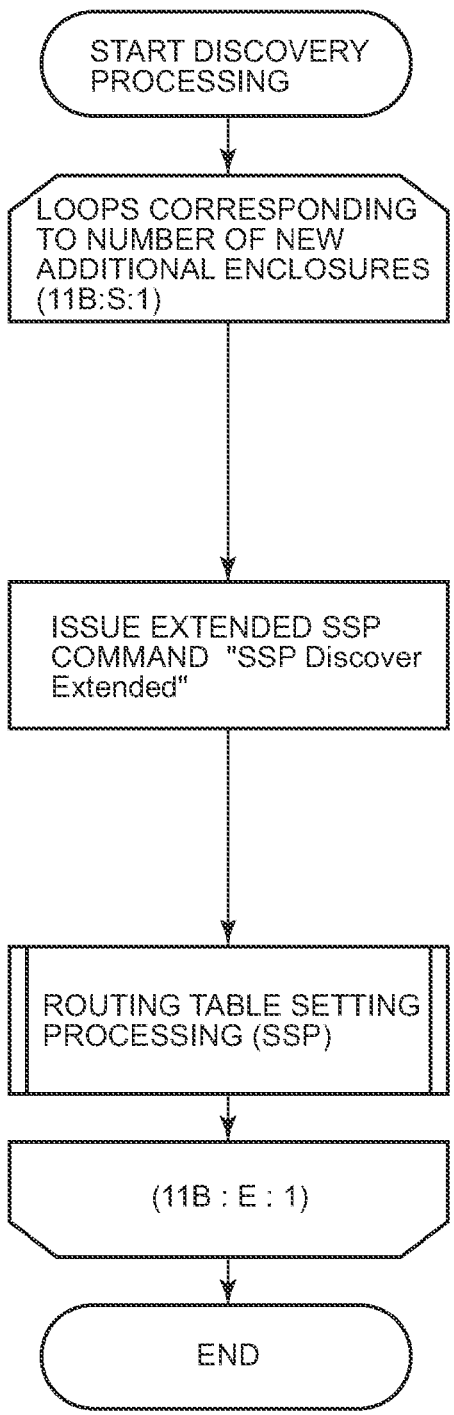
FIG. 11B shows an example of the flow of discovery processing using the extended SSP command "SSP Discover Extended"

Discovery processing using SSP is shown in FIG. 11B. In terms of a single cascade configuration and in relation to a single new additional enclosure 107, the extended SSP command issuing unit 682A of the RAID control unit 121A creates an extended SSP command "SSP Discover Extended" (see FIG. 10A), and transmits the extended SSP command "SSP Discover Extended" to the SAS expander 131A in the new additional enclosure 107. When the SAS expander 131A receives the extended SSP command "SSP Discover Extended", the connection with the SAS control unit 123A is broken. When the page code "B2H" included in the extended SSP command "SSP Discover Extended" is detected in the SAS expander 131A, the firmware 140A creates a response (see FIG. 10B) including the PHY information elements of all of the devices connected to all of the PHYs 151A of the SAS expander 131A. The SAS expander 131A is then reconnected to the SAS control unit 123A, whereupon the firmware 140A transmits the response to the extended SSP command issuing unit 682A.

When a single extended SSP command "SSP Discover Extended" is issued in relation to the single recognized new additional enclosure 107, and a response including the PHY information elements of all PHYs is obtained, the routing table setting processing is executed according to FIG. 11B. This routing table setting processing will now be described with reference to FIG. 12B. The extended SSP command issuing unit 682A of the RAID control unit 121A creates an extended SSP command "SSP Configure Route Information Extended". The extended SSP command "SSP Configure Route Information Extended" includes destination information elements relating to all of the devices obtained from all of the PHY information elements (in other words, destination information elements relating to all of the devices discovered upon issuance of the single extended SSP command "SSP Discover Extended"). The extended SSP command "SSP Configure Route Information Extended" is transmitted to the SAS expander 131A in the new additional enclosure 107. Upon reception of the extended SSP command "SSP Configure Route Information Extended", the SAS expander 131A breaks the connection with the SAS control unit 123A. In the SAS expander 131A, the firmware 140A sets all of the destination information elements included in the extended SSP command "SSP Configure Route Information Extended" in the routing table 154A. The SAS expander 131A is then reconnected, whereupon a response to the extended SSP command "SSP Configure Route Information Extended" is transmitted. The connection is then broken. The processing described above is executed on all of the SAS expanders 131A of a higher order than the new additional enclosure 107 one at a time in succession from the low order to the high order.

Figure 13B:
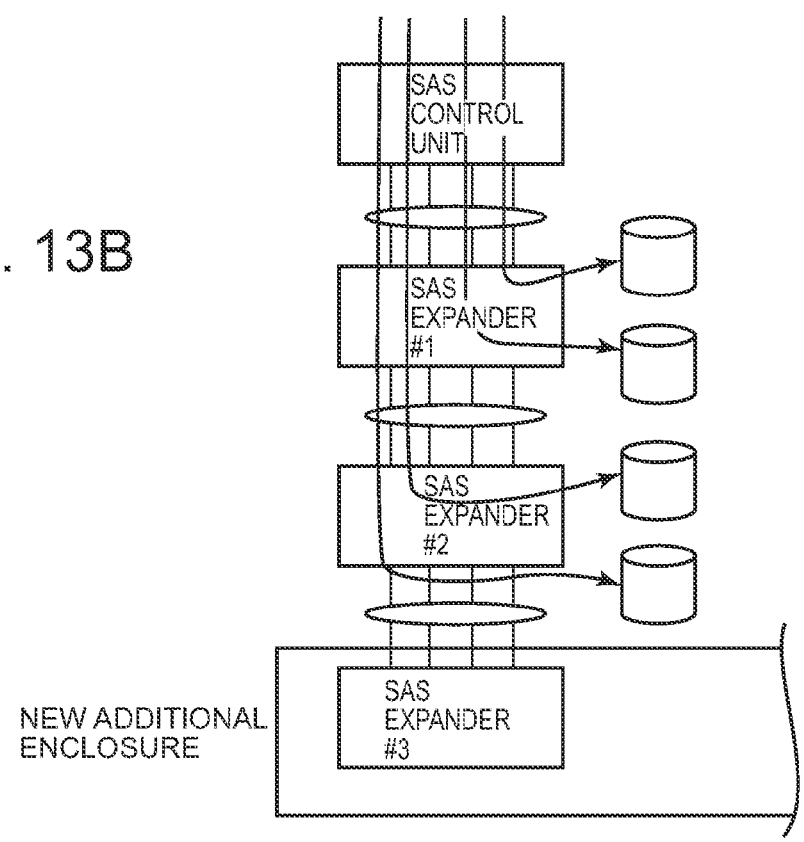
FIG. 13B shows a situation occurring during discovery processing or routing table setting processing using an extended SSP command in which resources are released during processing of the extended SSP command such that physical links allowing the passage of a drive I/O command are not limited.
Figure 15:
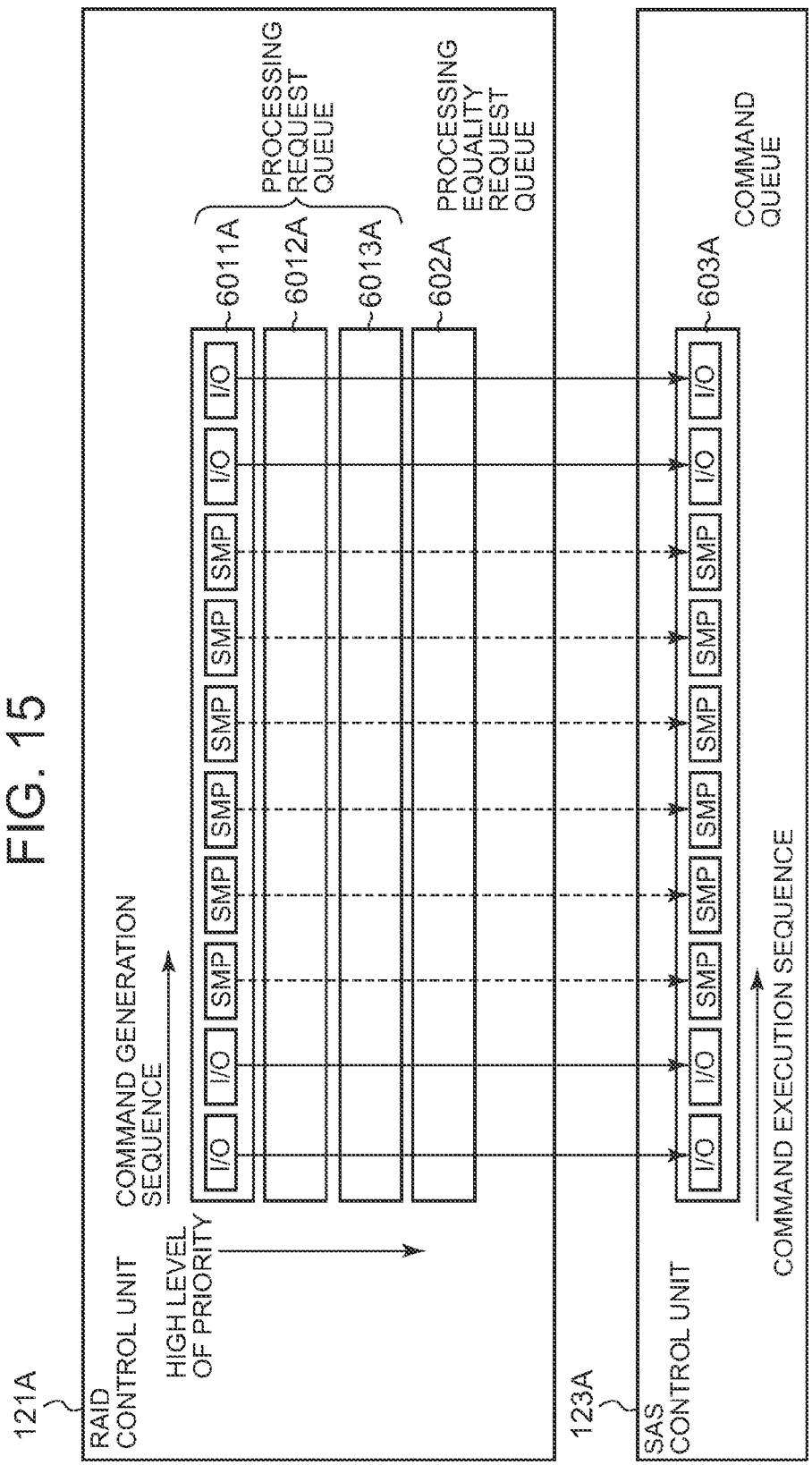
FIG. 15 is an illustrative view of a second example of command issuing control.

According to the flows described above, when a single extended SSP command "SSP Discover Extended" is issued, all of the devices relating to all of the PHYs 151A in a single SAS expander 131A are discovered, and when a single extended SSP command "SSP Configure Route Information Extended" is issued, the destination information elements relating to all of the discovered devices are written into the routing table 154A. Hence, in comparison with the SMP methods illustrated in FIGS. 11A and 12A, discovery processing and routing table setting processing can be performed using a small number of issued commands and a short resource occupancy length. Even when preparation of a response to the extended SSP command "SSP Discover Extended" and writing to the routing table 154A corresponding to the extended SSP command "SSP Configure Route Information Extended" take a longer time than in the case of SMP, the resources between the SAS control unit 123A and SAS expander 131A are released during command processing, and therefore a larger number of drive I/O commands can be transmitted than in the case of SMP (see FIG. 13B).

Note that when an extended SSP command cannot be transmitted in at least one of the discovery processing and routing table setting processing (or in other processing for issuing an extended SSP command or another type of SSP command), the processing of S103 onward in FIG. 6 may be performed (in other words, a determination may be made as to whether or not an SMP command can be issued and transmitted, and the diagnosis/restoration processing may be performed).

[Command Issuing Control Using a Plurality of Queue Types]

Drive I/O commands (SSP commands), extended SSP commands, SMP commands, and so on are issued from the command issuing unit 672A of the RAID control unit 121A, but when commands are issued to the SAS control unit 123A simply in order of issuance, the performance of the storage system 101 may deteriorate.

FIG. 14A shows an example of this. A queue (a command queue hereafter) 603A of accumulated commands is provided in the SAS control unit 123A. Commands accumulate in the command queue 603A in the order of issuance from the RAID control unit 121A. In this case, when a plurality of SMP commands are issued in a continuous order, the performance of the storage system 101 may deteriorate. The reason for this is that only one SMP command can be transmitted from a single SAS control unit 123A at a time, and therefore, a drive I/O command behind the continuous SMP commands remains in the command queue 603A for a long time.

Hence, in this embodiment, the following measures are taken.

As shown in FIG. 14B, two types of queues are prepared in the RAID control unit 121A. A processing request queue is provided as a first queue type. A plurality of processing request queues are provided, and each processing request queue has a different level of priority. As an example, three processing request queues 6011A, 6012A, and 6013A, corresponding respectively to priority levels of "high", "medium", and "low", are provided. A processing equality request queue 602A is provided as a second queue type.

The command issuing unit 672A stores a command in a queue selected from among the four queues, i.e. the processing request queues 6011A to 6013A and the processing equality request queue 602A. The command issuing control unit 742A checks each of the queues 6011A to 6013A and 602A periodically. When the command issuing control unit 742A discovers that commands have accumulated in a queue, the command issuing control unit 742A outputs one of the commands in the queue to the SAS control unit 123A. Commands accumulate in the command queue 603A of the SAS control unit 123A in order of reception from the RAID control unit 121A.

As a first example of command issuing control, when the command issuing unit 672A issues a drive I/O command (SSP command), the drive I/O command (SSP command) is stored in the processing request queue 6011A having a "high" priority level, and when the command issuing unit 672A issues an SMP command, the SMP command is stored in the processing request queue 6012A having a "medium" priority level (or the processing request queue 6013A having a "low" priority level), which is lower than the priority level of the drive I/O command. The command issuing control unit 742A then outputs the drive I/O command stored in the "high" priority level processing request queue 6011A to the SAS control unit 123A preferentially. More specifically, for example, the checking interval at which the command issuing control unit 742A checks the "high" priority level processing request queue 6011A is set to be shortest, the checking interval of the "medium" priority level processing request queue 6012A is set to be next shortest, and the checking interval of the "low" priority level processing request queue 6013A is set to be longest, and when commands are discovered as a result of the check, one of the discovered commands is output from the queue. Hence, as the priority level of the processing request queue increases, an accumulation of commands is discovered more quickly, and the commands are output to the SAS control unit 123A more quickly.

As a second example of command issuing control, the priority level of a highly urgent SMP command is set to be equal to that of a drive I/O command. More specifically, the command issuing unit 672A stores a highly urgent SMP command in the "high" priority level processing request queue 6011A. A highly urgent SMP command may be an SMP command used during fault specification processing (for example, the SMP command issued in S103 of FIG. 6), and/or an SMP command issued to correct the routing table 154A (i.e. the SMP command issued during the processing of FIG. 8).

As a third example of command issuing control, the command issuing unit 672A stores a type of SMP command that is issued regularly in the processing equality request queue 602A. The command issuing control unit 742A checks the processing equality request queue 602A at identical checking intervals to the "high" priority level processing request queue 6011A. Hence, when a drive I/O command is stored in the "high" priority level processing request queue 6011A at substantially the same time as an SMP command is stored in the processing equality request queue 602A, the drive I/O command and the SMP command are output to the SAS control unit 123A alternately.

[BP (Broadcast Primitive) Broadcasting]

According to SAS standards, the monitoring function can be offloaded to the SAS expander 131, i.e. a device of a lower order than the controller 110.

As shown in FIG. 17, for example, three SAS expanders 131 (SAS expanders #1, #2 and #3) are connected in cascade form in both of the cascade configurations, and it is assumed that the firmware 140A and 140B (more specifically, monitoring control units 694A and 694B) of SAS expanders #2A and #2B detect a change of state (the generation of a fault, for example) in the monitoring subject device 141 serving as a monitoring subject. In this case, the two SAS expanders #2A and #2B each create and broadcast a BP (SES). Thus, the BPs (SES) are transmitted to both the higher order and lower order of the SAS expanders #2A and #2B in bucket brigade form. As a result, the controllers 110A and 110B receive the BPs (SES) broadcast respectively by the SAS expanders #2A and #2B. More specifically, the RAID control units 121A and 121B receive the BPs (SES) via the SAS control units 123A and 123B.

However, an abnormal case in which the BPs (SES) broadcast respectively by the SAS expanders #2A and #2B do not reach both of the controllers 110A and 110B may occur.

Figure 18A:
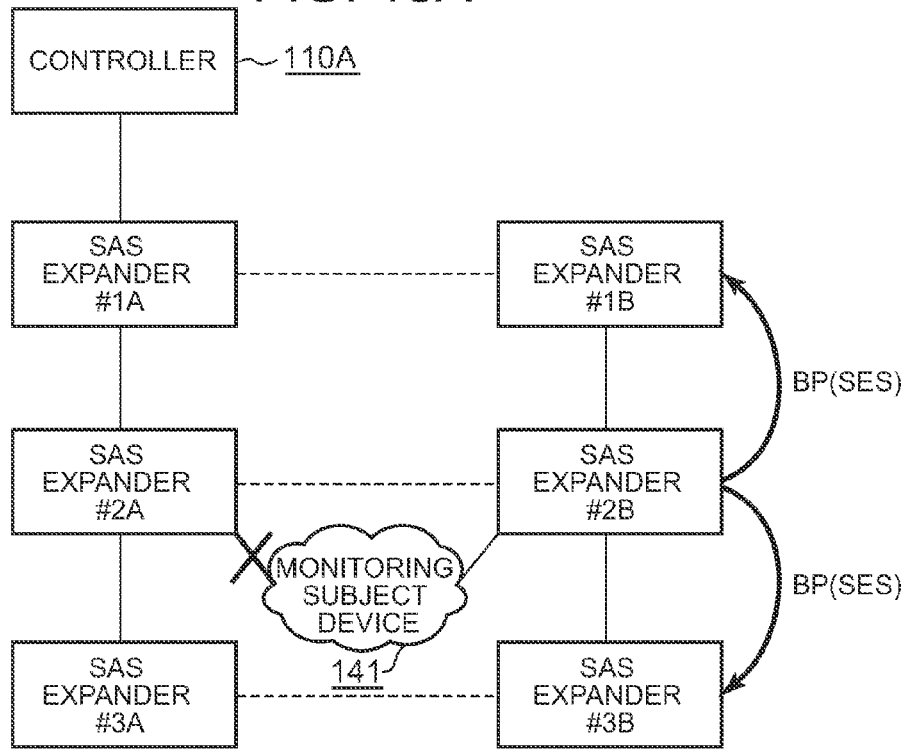
FIG. 18A shows a first abnormal case in which the BP (SES) does not reach the controller.

A case shown in FIG. 18A serves as an example of a first abnormal case. In this case, the other controller does not exist, and therefore a fault occurs between the SAS expander #2A and the monitoring subject device 141. As shown in FIG. 18A, in this case the SAS expander #2A is incapable of detecting a change of state in the monitoring subject device 141, and therefore a BP (SES) is not transmitted from the SAS expander #2A. Hence, a BP (SES) does not reach the controller 110A. Furthermore, even if a BP (SES) is broadcast from the other SAS expander #2B, the other controller does not exist, and therefore the BP (SES) does not reach the other controller.

Figure 19A:
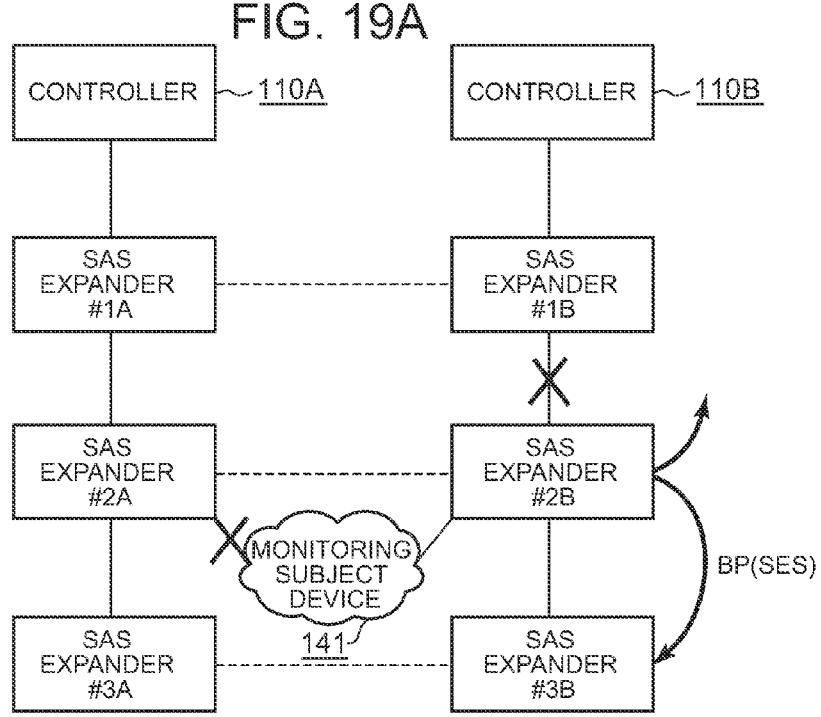
FIG. 19A shows a second abnormal case in which the BP (SES) does not reach the controller.

A case shown in FIG. 19A serves as an example of a second abnormal case. In this case, a fault occurs between the SAS expander #2A and the monitoring subject device 141, and a fault also occurs between the other SAS expander #1B and the other SAS expander #2B. As shown in FIG. 19A, in this case the SAS expander #2A is incapable of detecting a change of state in the monitoring subject device 141, and therefore a BP (SES) is not transmitted from the SAS expander #2A. Hence, a BP (SES) does not reach the controller 110A. Further, a BP (SES) is broadcast from the other SAS expander #2B, but since a fault has occurred between the SAS expander #2B and the higher order SAS expander #1B, the BP (SES) is not transmitted to the higher order. Accordingly, the BP (SES) does not reach the other controller 110B.

In this embodiment, the SAS expander 131A and the other SAS expander 131B are physically connected via the IIC 161A (see FIG. 3), and BP generation I/Fs 692A and 692B are provided in the firmware 140A and 140B executed by the SAS expanders 131A and 131B as interfaces for receiving an instruction to generate a BP (see FIG. 4B).

Figure 18B:
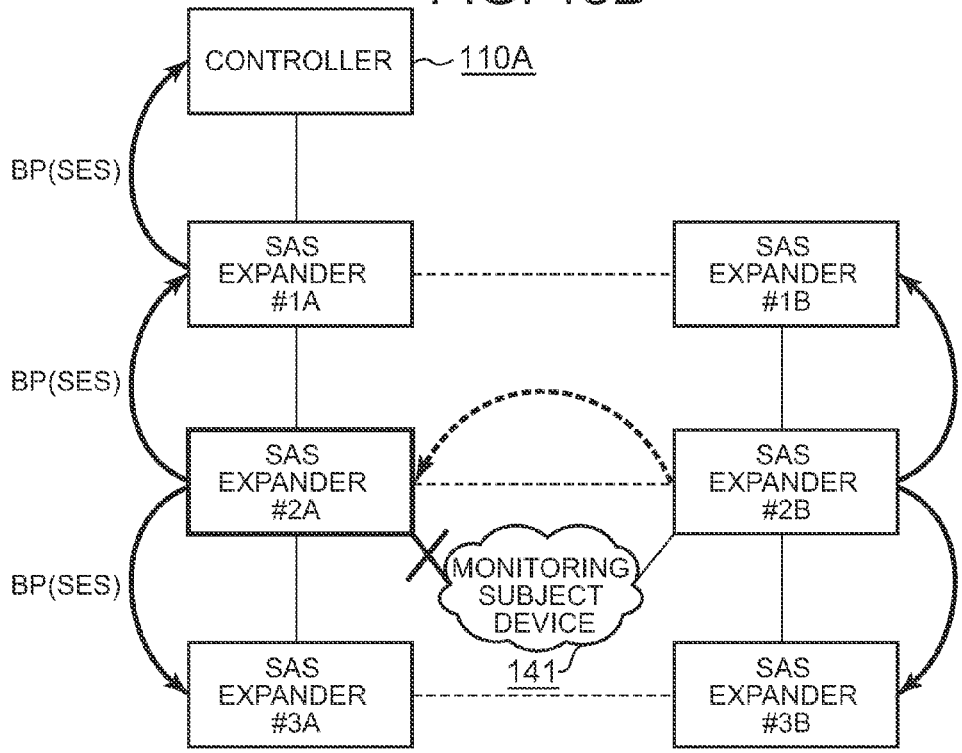
FIG. 18B is an illustrative view of a solving method for ensuring that the BP (SES) reaches the controller when the first abnormal case arises.

As shown in FIG. 18B, in the first abnormal case described above, the monitoring control unit 694B in the firmware 140B executed by the other SAS expander #2B transmits a request for BP (SES) generation to the SAS expander #2A through the BP generation I/F 692B. The monitoring control unit 694A in the firmware 140A executed by the SAS expander #2A receives the BP (SES) generation request from the other SAS expander #2B through the BP generation I/F 692A, and in response to the request, creates and broadcasts a BP (SES). Thus, even when the first abnormal case arises, the BP (SES) reaches the controller 110.

Figure 19B:
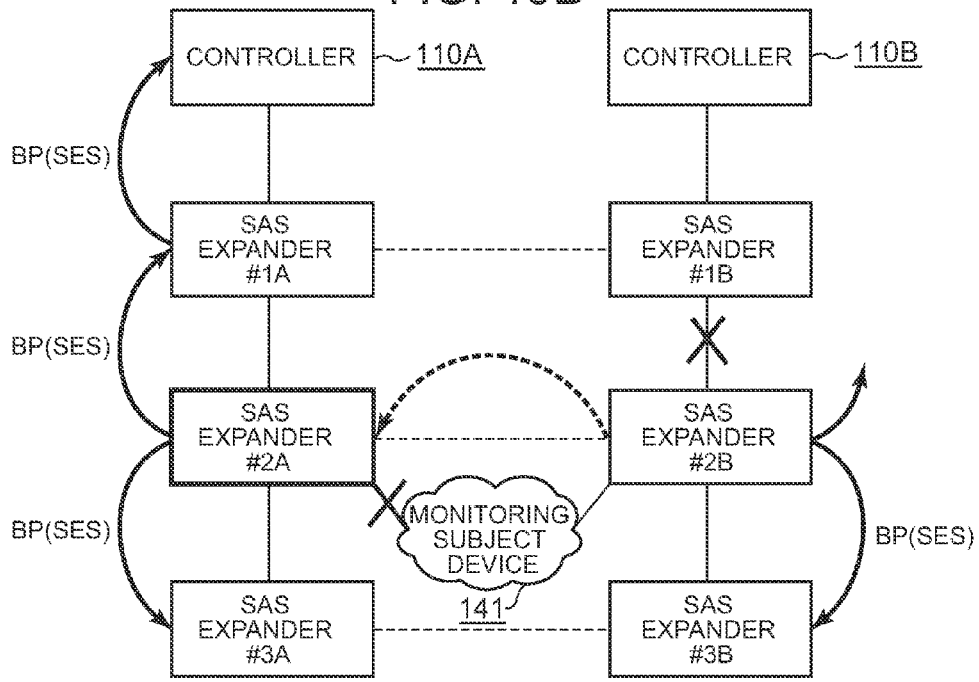
FIG. 19B is an illustrative view of a solving method for ensuring that the BP (SES) reaches the controller when the second abnormal case arises.

As shown in FIG. 19B, in the second abnormal case described above, similarly to the first abnormal case, a BP (SES) generation request is transmitted to the SAS expander #2A from the other SAS expander #2B. Thus, the BP (SES) is transmitted from the SAS expander #2A, and as a result, even when the second abnormal case arises, a BP (SES) reaches the controller 110A.

Figure 20A:
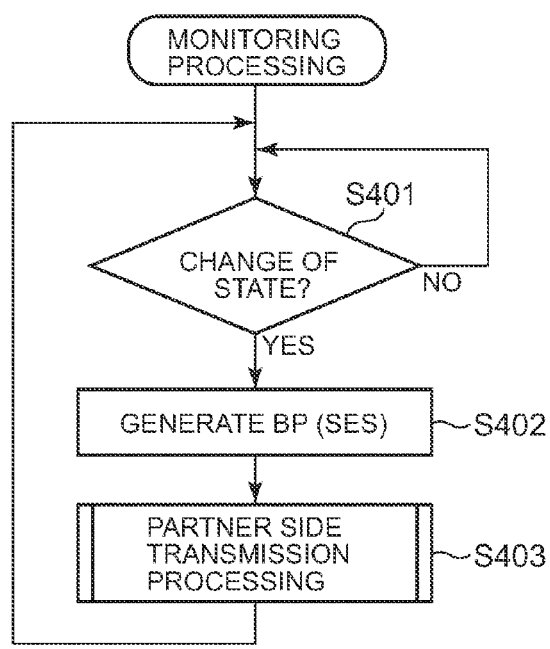
FIG. 20A shows an example of the flow of monitoring processing executed by a monitoring control unit in the firmware of the SAS expander.
Figure 20B:
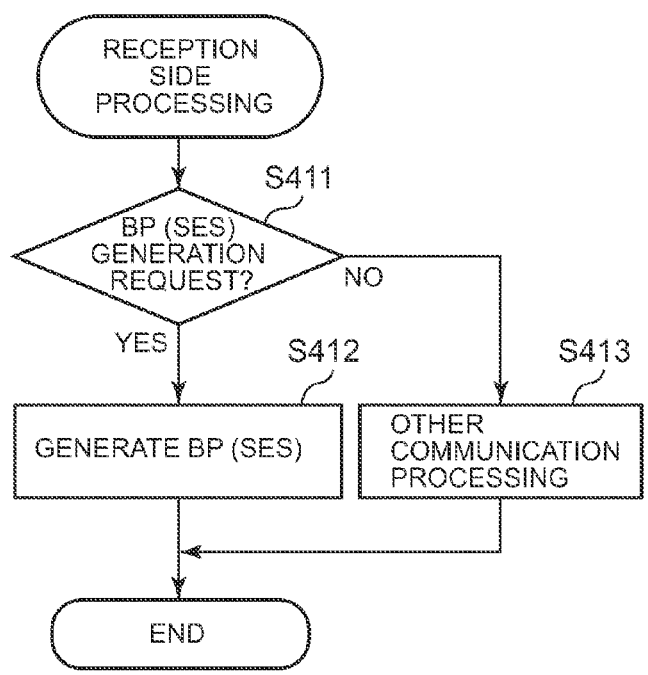
FIG. 20B shows an example of the flow of reception side processing executed by the monitoring control unit in the firmware of the SAS expander.
Figure 20C:
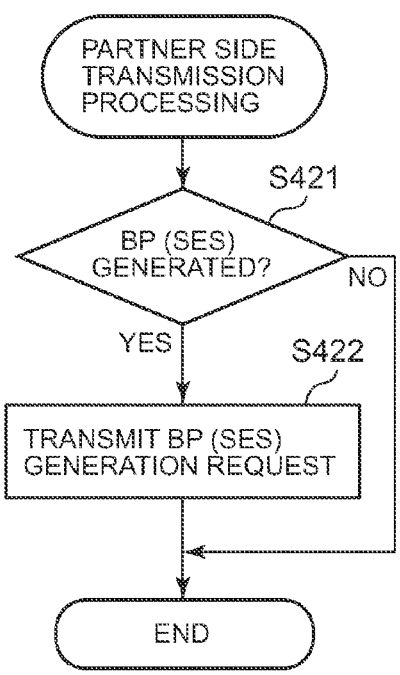
FIG. 20C shows an example of the flow of partner side transmission processing executed by the monitoring control unit in the firmware of the SAS expander.

Referring to FIGS. 20A and 20C, processing performed by the monitoring control unit 694B in the firmware 140B executed by the other SAS expander #2B will be described in relation to the first and second abnormal cases described above. Also, referring to FIG. 20B, processing performed by the monitoring control unit 694A in the firmware 140A executed by the SAS expander #2A will be described. Note that for convenience of description, the SAS expanders #2A and #2B are used as examples, but any of the processing to be described with reference to FIGS. 20A, 20B, and 20C may be applied to the firmware 140 in any of the other SAS expanders.

As shown in FIG. 20A, the monitoring control unit 694B monitors (polls) the monitoring subject devices 133B, 141. Having detected a change of state (S401: YES), the monitoring control unit 694B creates and broadcasts a BP (SES) (S402). Thereafter, partner side transmission processing (S403) is performed. More specifically, as shown in FIG. 20C, the monitoring control unit 694B determines whether or not a BP (SES) has been generated (S421), and when generation of a BP (SES) is detected (in S402, for example, a BP (SES) has been generated), the monitoring control unit 694B transmits a BP (SES) generation request to the partner SAS expander #2A through the BP generation I/F 692B. The BP (SES) generation request is transmitted to the partner SAS expander #2A through the IIC 161B.

As shown in FIG. 20B, in response to the input of a request, for example, the monitoring control unit 694A in the firmware 140A of the partner SAS expander #2A determines whether or not a BP (SES) generation request has been received (S411). When a BP (SES) generation request has been input, the monitoring control unit 694A generates and broadcasts a BP (SES) (S412). On the other hand, when another type of request has been input, communication processing corresponding to the request is executed by the firmware 140A (S413).

Figure 21:
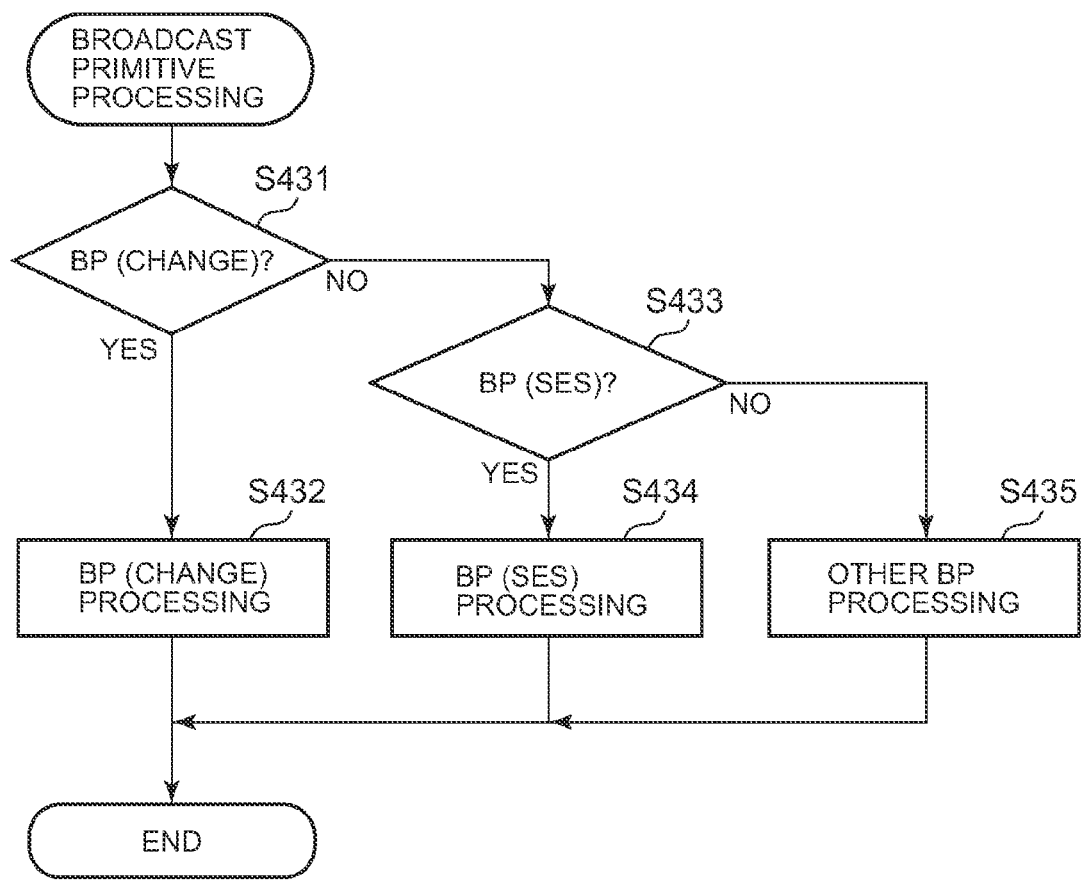
FIG. 21 shows an example of the flow of BP processing performed by the RAID control unit.

FIG. 21 shows an example of the flow of BP processing performed by the BP processing unit 674A in the RAID control unit 121A.

The BP processing unit 674A is able to begin BP processing upon reception of a BP. The BP processing unit 674A determines whether or not a BP (CHANGE) has been received (S431). When it is determined that a BP (CHANGE) has been received, the BP processing unit 674A executes BP (CHANGE) processing (S432). The discovery processing shown in FIG. 11B, for example, may be begun as the BP (CHANGE) processing.

If it is determined in S431 that a BP (CHANGE) has not been received, the BP processing unit 674A determines whether or not a BP (SES) has been received (S433). If it is determined that a BP (SES) has been received, the BP processing unit 674A executes BP (SES) processing (S432). On the other hand, if it is determined that a BP (SES) has not been received, processing corresponding to the received BP is executed (S435).

Figure 22:
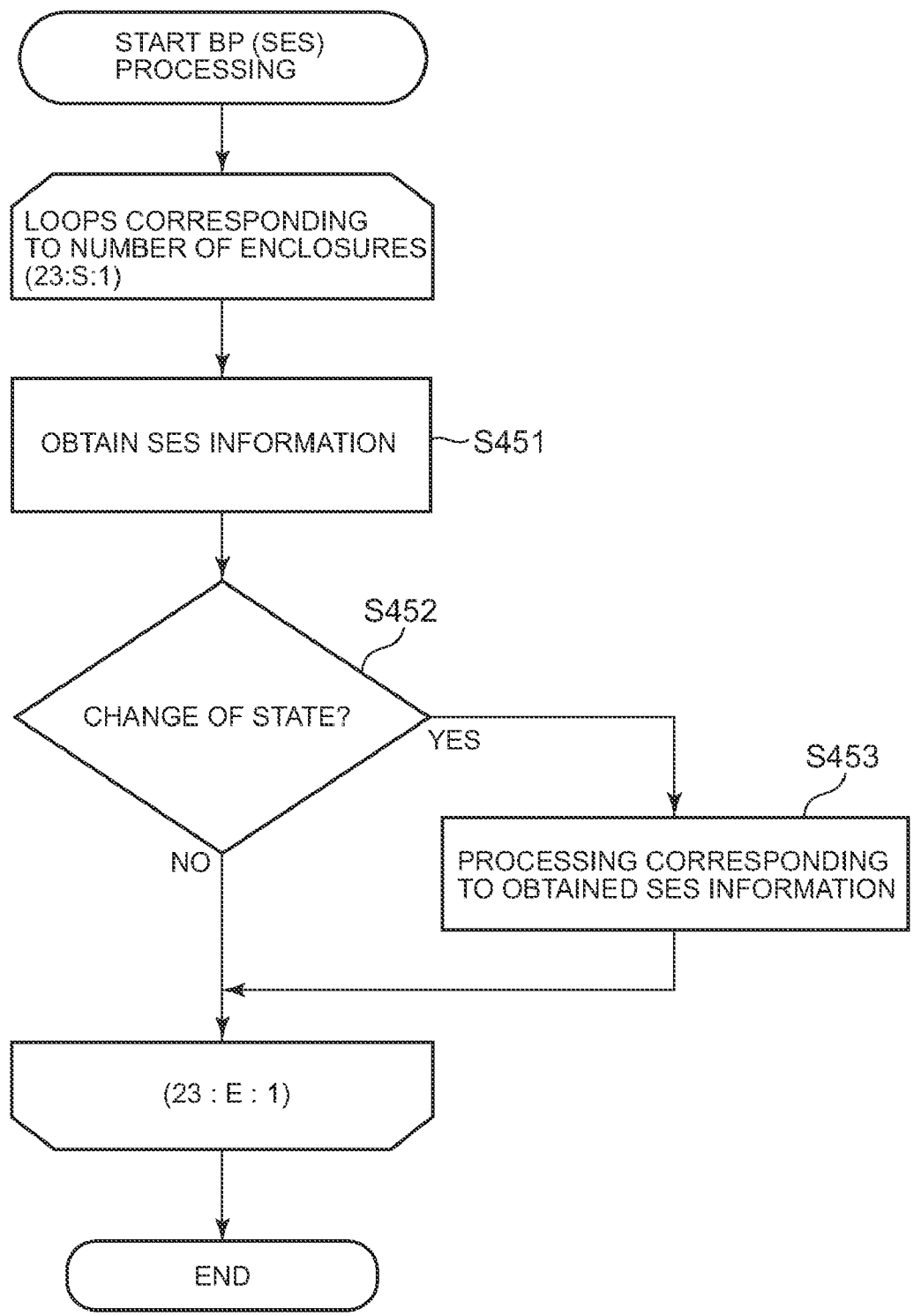
FIG. 22 shows an example of the flow of BP (SES) processing performed by the RAID control unit.

FIG. 22 shows an example of the flow of BP (SES) processing performed by the BP processing unit 674A.

In S451, the BP processing unit 674A obtains SES information from the target SAS expander 131A (S451). More specifically, for example, the BP processing unit 674A causes an SSP command for obtaining the SES information to be transmitted from the command issuing unit 672A to the target SAS expander 131A, and receives the SES information in response thereto via the command issuing unit 672A. In S452, the BP processing unit 674A determines from the obtained SES information whether or not a change of state in the monitoring subject device 133A or 141 has been detected by the target SAS expander 131A (in other words, whether or not a change of state has occurred in the monitoring subject device 133A or 141). When the result of the determination is affirmative, the BP processing unit 674A executes processing corresponding to the obtained SES information (for example, if a fault has been detected, processing for responding to the fault) in S453.

S451, S452 and S453 described above are executed in sequence from the highest order SAS expander 131A in the basic enclosure 105 to the lowest order SAS expander 131A.

Several embodiments of the present invention were described above, but these embodiments are merely examples for illustrating the present invention, and the scope of the present invention is not limited to these embodiments alone. The present invention may be implemented in various other embodiments. For example, the RAID control unit 121 may diagnose at least one of the SAS control unit 123, SAS expander 131, and disk drive 111 periodically, and transmit a command serving as an enquiry into the state thereof using SSP for the purposes of the diagnosis. When a connection for transmitting the command using SSP cannot be established or the like, the routine may advance to S103 in FIG. 6.

What is claimed is:

1. A storage system, comprising:
switch devices having a plurality of ports;
a plurality of storage devices coupled to the switch devices via one or more of the plurality of ports; and
a controller for issuing a second command to a target switch device of the switch devices, wherein the second command is defined according to a second protocol and corresponds to a discovery command which is defined according to a first protocol, and
wherein, when the second command is issued from the controller to the target switch device, the target switch device is configured to:
break a connection between the controller and the target switch device;
create a discovery response of the plurality of storage devices coupled to the plurality of ports of the target switch device;
establish a new connection between the controller and the target switch device; and
transmit the discovery response to the controller.

2. The storage system according to claim 1, wherein the second command is issued when a new enclosure, which includes switch devices and a plurality of storage devices, is added to the storage system, and the target switch device is one of the switch devices of the new enclosure.

3. The storage system according to claim 1, wherein:
each of the switch devices manages a routing table including information of the plurality of storage devices which is coupled to the target switch devices and lower order switch devices via which the target switch device is coupled to the controller;
when the target switch device receives the discovery response, the controller is configured to issue a third command to the target switch device, wherein the third command is defined according to the second protocol, corresponds to a configure route information command which is defined according to a first protocol, and includes the information of the plurality of storage devices obtained by the discovery response; and
when the target switch device receives the third command, the target switch device is configured to:
break a connection between the controller and the target switch device;
update the routing table based on the information of the third command;
establish a new connection between the controller and the target switch device; and
transmit a response of the configure route information command to the controller.

4. The storage system according to claim 3, wherein the controller is configured to transmit the configure route information command to the switch devices of a higher order than the target switch device at time in succession from a low order to a high order.

5. The storage system according to claim 1, wherein:
the first protocol is a protocol in which a connection that is established for transmitting a command to a target remains established during processing of the command by the target; and
the second protocol is a protocol in which a connection that is established for transmitting a command to a target is broken during processing of the command by the target.

6. The storage system according to claim 1, wherein:
the first protocol is a Serial Management Protocol;
the second protocol is a Serial Small Computer System Interface (SCSI) Protocol; and
the target switch device is a Serial Attached SCSI expander.

7. A method for use in a storage system, the storage system including switch devices having a plurality of ports, a plurality of storage devices coupled to the switch devices via one or more of the plurality of ports, and a controller, the method comprising:
issuing a second command from the controller to a target switch device of the switch devices, wherein the second command is defined according to a second protocol and corresponds to a discovery command which is defined according to a first protocol;
breaking a connection between the controller and the target switch device, by the target switch device;
creating a discovery response of the plurality of storage devices coupled to the plurality of ports of the target switch device, by the target switch device;
establishing a new connection between the controller and the target switch device, by the target switch device; and
transmitting the discovery response from the target switch device to the controller.

8. The method according to claim 7, wherein the issuing is performed when a new enclosure, which includes switch devices and a plurality of storage devices, is added to the storage system, and the target switch device is one of the switch devices of the new enclosure.

9. The method according to claim 7, further comprising:
managing a routing table by each of the switch devices, the routing table including information of the plurality of storage devices which is coupled to the target switch devices and lower order switch devices via which the target switch device is coupled to the controller;
issuing a third command from the controller to the target switch device when the target switch device receives the discovery response, wherein the third command is defined according to the second protocol, corresponds to a configure route information command which is defined according to a first protocol, and includes the information of the plurality of storage devices obtained by the discovery response;
when the target switch device receives the third command, the target switch device:
breaking a connection between the controller and the target switch device;
updating the routing table based on the information of the third command;
establishing a new connection between the controller and the target switch device; and
transmitting a response of the configure route information command to the controller.

10. The method according to claim 9, further comprising:
transmitting the configure route information command from the controller to the switch devices of a higher order than the target switch device at time in succession from a low order to a high order.

11. The method according to claim 7, wherein:
the first protocol is a protocol in which a connection that is established for transmitting a command to a target remains established during processing of the command by the target; and
the second protocol is a protocol in which a connection that is established for transmitting a command to a target is broken during processing of the command by the target.

12. The method according to claim 7, wherein:
the first protocol is a Serial Management Protocol;
the second protocol is a Serial Small Computer System Interface (SCSI) Protocol; and
the target switch device is a Serial Attached SCSI expander.

* * * * *